(12) United States Patent
Furuya et al.

(10) Patent No.: US 9,710,583 B2
(45) Date of Patent: Jul. 18, 2017

(54) INFORMATION PROCESSING APPARATUS, STATE MACHINE DIVIDING METHOD, AND COMPUTER-READABLE RECORDING MEDIUM

(71) Applicant: FUJITSU LIMITED, Kawasaki-shi, Kanagawa (JP)

(72) Inventors: Akiko Furuya, Yokohama (JP); Nobuaki Kawasoe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 14/918,631

(22) Filed: Oct. 21, 2015

(65) Prior Publication Data

US 2016/0188759 A1 Jun. 30, 2016

(30) Foreign Application Priority Data

Dec. 24, 2014 (JP) ................. 2014-261297

(51) Int. Cl.
*G06F 17/50* (2006.01)
(52) U.S. Cl.
CPC ........ *G06F 17/505* (2013.01); *G06F 17/5072* (2013.01); *G06F 17/5081* (2013.01)

(58) Field of Classification Search
CPC ....................................... G06F 17/50
USPC ............................................. 716/105
See application file for complete search history.

(56) References Cited

U.S. PATENT DOCUMENTS

| 2001/0011363 A1 | 8/2001 | Nishida et al. |
| 2009/0031276 A1* | 1/2009 | Seno ............ G06F 17/5045 716/104 |
| 2014/0189633 A1 | 7/2014 | Yamamoto et al. |

FOREIGN PATENT DOCUMENTS

| JP | 2001-209670 | 8/2001 |
| JP | 2014-142918 | 8/2014 |

* cited by examiner

*Primary Examiner* — Thuan Do
(74) *Attorney, Agent, or Firm* — Fujitsu Patent Center

(57) ABSTRACT

A non-transitory computer-readable recording medium stores a state machine dividing program that causes a computer to execute a process including: determining whether a design value based on circuit information that indicates a circuit that controls a computation process by using a state machine is greater than a predetermined reference value; and dividing, when the design value is greater than the reference value, the state machine into a plurality of state machines.

14 Claims, 23 Drawing Sheets

FIG.4

| STATE NAME | main_state_name[m] |
|---|---|
| TRANSITION SOURCE STATE INDEX | main_in_id[m][a] |
| TRANSITION CONDITION FROM TRANSITION SOURCE | main_in_cond[m][a] |
| TRANSITION DESTINATION STATE INDEX | main_out_id[m][b] |
| TRANSITION CONDITION TO TRANSITION DESTINATION | main_out_cond[m][b] |

12c
12b
12a

| STATE NAME | sub_state_name[m][k+1] |
|---|---|
| TRANSITION SOURCE STATE INDEX | sub_in_id[m][k+1][a] |
| TRANSITION CONDITION FROM TRANSITION SOURCE | sub_in_cond[m][k+1][a] |
| TRANSITION DESTINATION STATE INDEX | sub_out_id[m][k+1][b] |
| TRANSITION CONDITION TO TRANSITION DESTINATION | sub_out_cond[m][k+1][b] |
| REFERENCE TARGET OF STATE | sub_reg[m][k+1][c] |

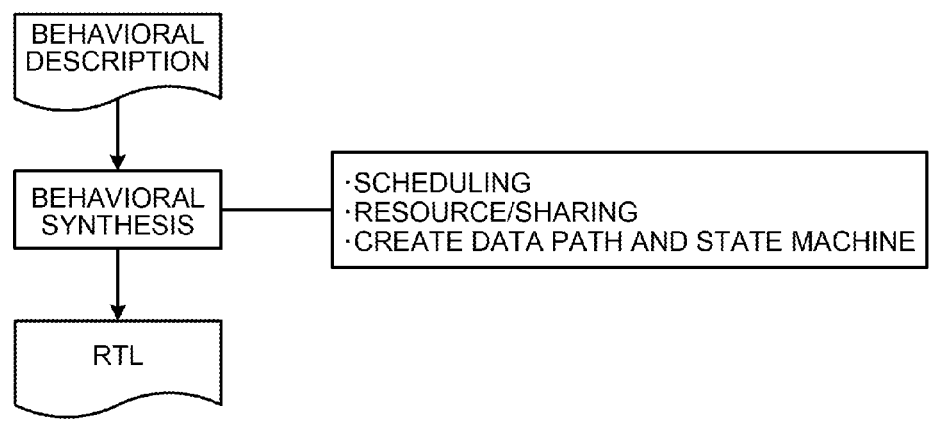

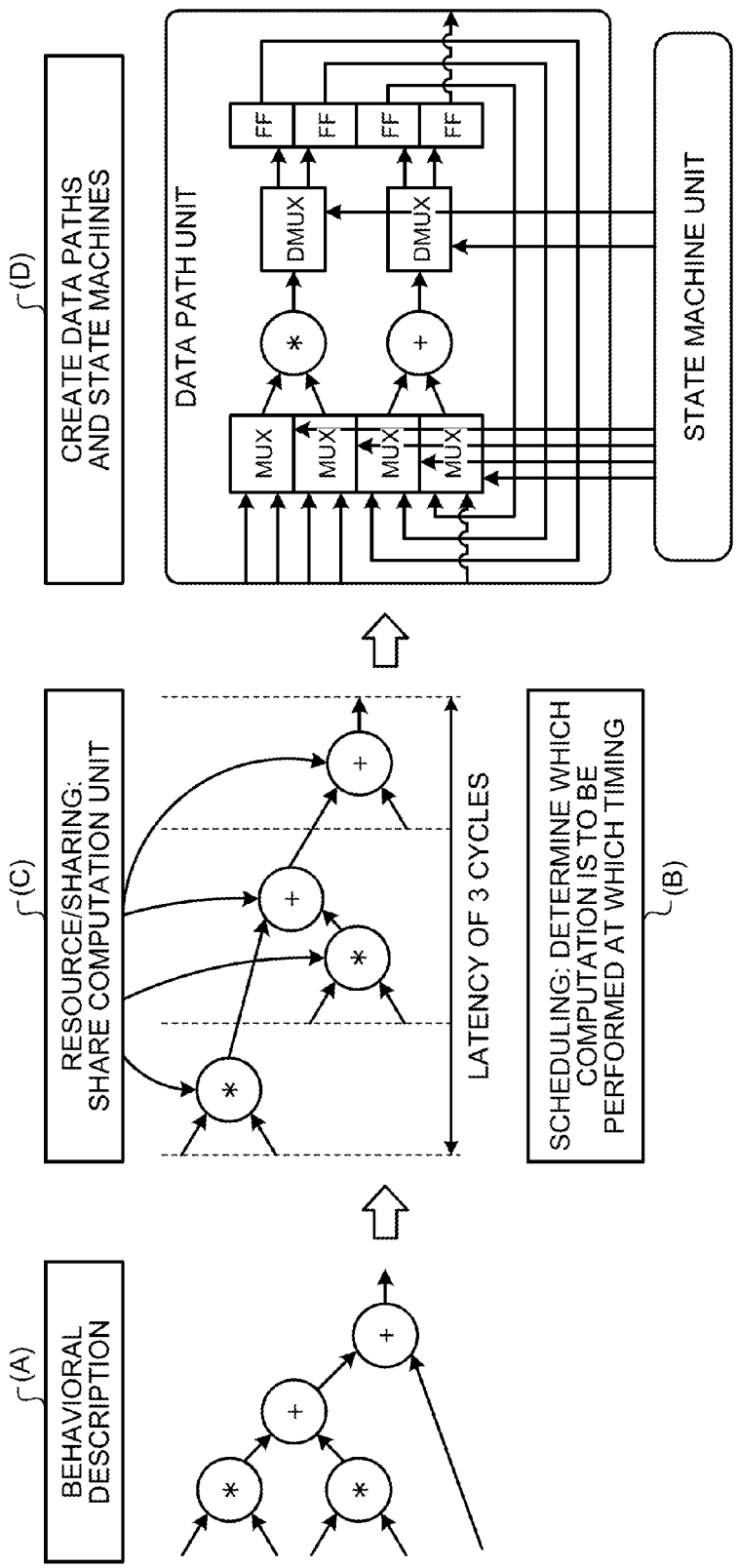

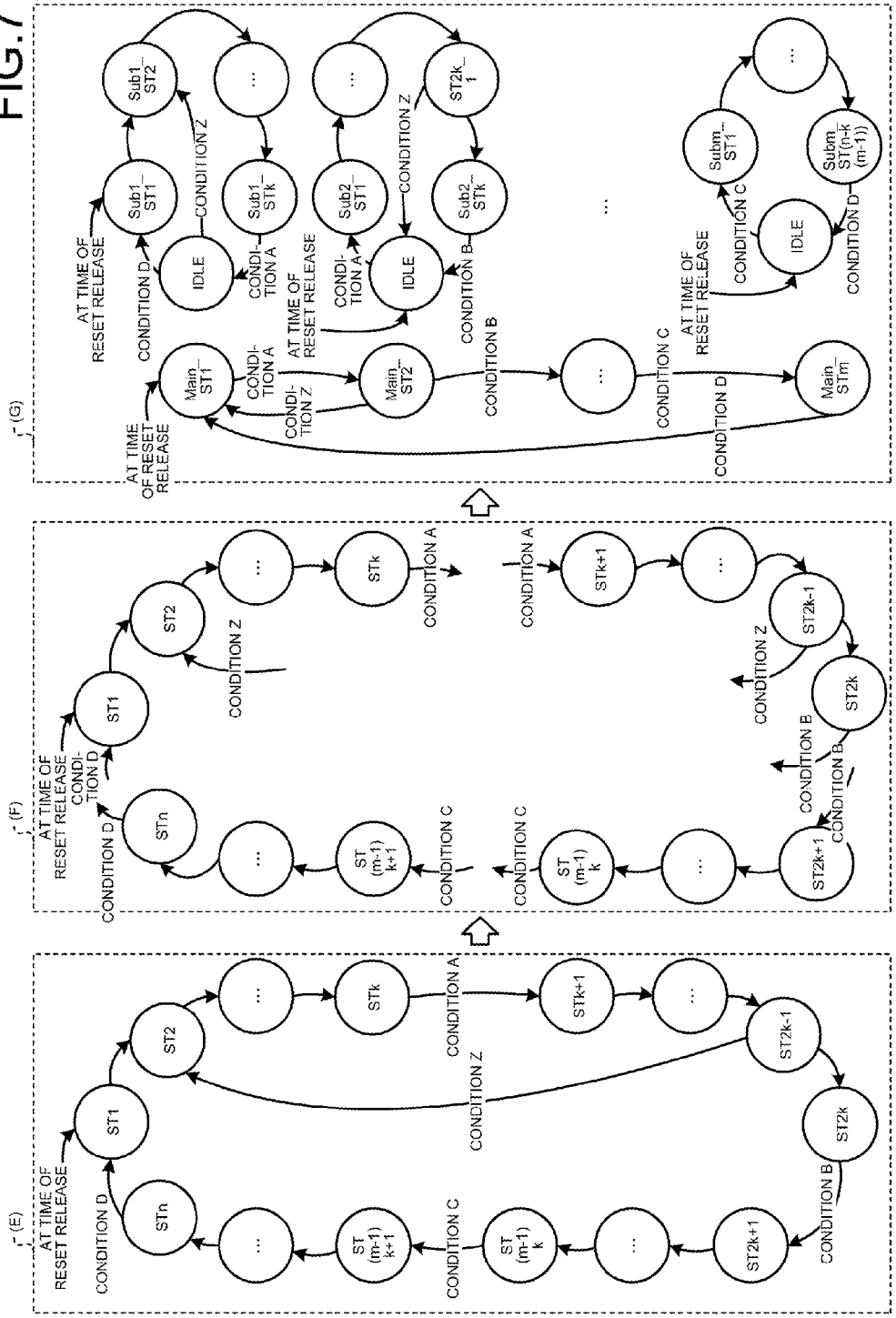

INFORMATION PROCESSING APPARATUS, STATE MACHINE DIVIDING METHOD, AND COMPUTER-READABLE RECORDING MEDIUM

CROSS-REFERENCE TO RELATED APPLICATION

This application is based upon and claims the benefit of priority of the prior Japanese Patent Application No. 2014-261297, filed on Dec. 24, 2014, the entire contents of which are incorporated herein by reference.

FIELD

The embodiments discussed herein are related to a computer-readable recording medium, an information processing apparatus, and a state machine dividing method.

BACKGROUND

Conventionally, a technology of synthesizing logic circuits by computers is known. As an example of this technology, there is a known behavioral synthesis system that converts behavioral descriptions in which functions of logic circuits are described without being aware of clocks to Register Transfer Level (RTL) descriptions in which functions of registers are described based on the clocks. For example, the behavioral synthesis system performs behavioral synthesis by setting, based on a behavioral description, the scheduling of computation and resource/sharing of computation units and creating data paths and state machines that control the computation contents and the computation timing.

As an example of the behavioral synthesis system, there is a known technology that detects a false path, from among created data paths, in which the entirety of the path does not become active, and that reduces the number of data paths targeted for optimization of the latency. Furthermore, there is a known behavioral synthesis system that considers connections between modules provided in a circuit and that optimizes the positions in which flip-flops (FFs) that adjust the latency are inserted.

Patent Document 1: Japanese Laid-open Patent Publication No. 2001-209670

Patent Document 2: Japanese Laid-open Patent Publication No. 2014-142918

However, with the related technologies, if an automatically created state machine becomes a problem in terms of the operation timing of circuits, because a user rewrites the behavioral description based on the result of the timing analysis obtained by using RTL, there is a problem in that it takes time to design a circuit.

For example, if a user recreates a behavioral description based on the result of the timing analysis, because a behavioral description with a high abstraction level is not able to be described, it is difficult to reduce the Turn Around Time (TAT) of the design or the simulation time. Furthermore, if a user recreates a behavioral description based on the result of the timing analysis, because the user creates the behavioral description by considering the operation timing when a process is actually performed, the behavioral description is not diverted to circuits that have different technologies or operation frequencies and thus the reuse of the behavioral description is decreased. Furthermore, if it is found that a state machine becomes a problem in terms of the operation timing at the time of placement and wiring of a circuit, because a review is performed from a behavioral description, a loss in a process is increased. Consequently, with a method in which a user recreates a behavioral description based on the result of the timing analysis of the RTL, it takes time to design a circuit.

Accordingly, it is an object in one aspect of an embodiment of the invention to provide a state machine dividing program, an information processing apparatus, and a state machine dividing method that reduce the time taken to design a circuit.

SUMMARY

According to an aspect of the embodiments, a non-transitory computer-readable recording medium stores a state machine dividing program that causes a computer to execute a process including: determining whether a design value based on circuit information that indicates a circuit that controls a computation process by using a state machine is greater than a predetermined reference value; and dividing, when the design value is greater than the reference value, the state machine into a plurality of state machines.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a schematic diagram illustrating an example of information on divided state machines stored in the behavioral synthesis device according to the first embodiment;

FIG. 5 is a schematic diagram illustrating an example of a process performed by a behavioral synthesis unit according to the first embodiment;

FIG. 6 is a schematic diagram illustrating an example of a behavioral synthesis process;

FIG. 7 is a schematic diagram illustrating a process in which the behavioral synthesis device according to the first embodiment divides a state machine;

DESCRIPTION OF EMBODIMENTS

Preferred embodiments will be explained with reference to accompanying drawings. The embodiments of the state machine dividing program, the information processing apparatus, and the state machine dividing method disclosed in the present invention are not limited to the embodiments described below.

[a] First Embodiment

Example of a Behavioral Synthesis Device

Figure 1:
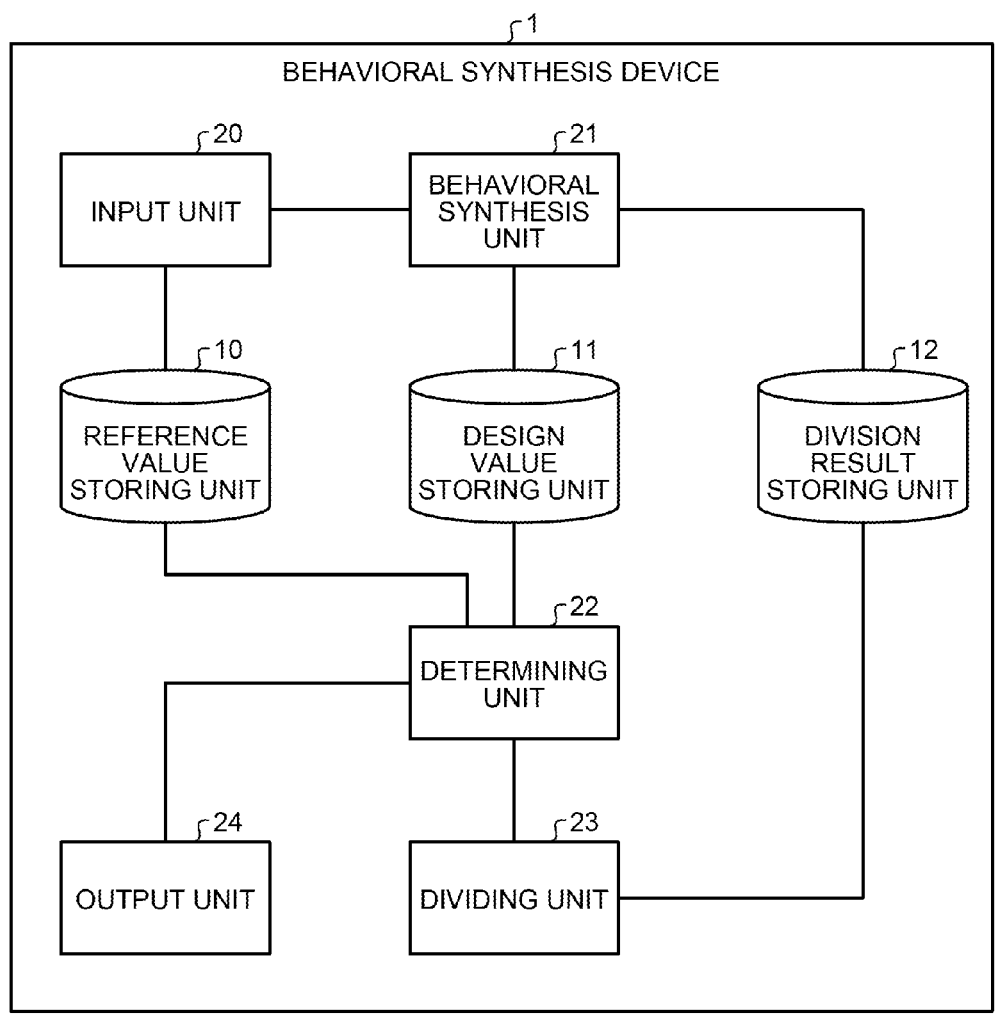
FIG. 1 is a schematic diagram illustrating an example of a functional configuration of a behavioral synthesis device according to a first embodiment.

FIG. 1 is a schematic diagram illustrating an example of a functional configuration of a behavioral synthesis device according to a first embodiment. As illustrated in FIG. 1, a behavioral synthesis device 1 includes a reference value storing unit 10, a set value storing unit 11, a division result storing unit 12, an input unit 20, a behavioral synthesis unit 21, a determining unit 22, a dividing unit 23, and an output unit 24.

The behavioral synthesis device 1 illustrated in FIG. 1 converts a behavioral description in which the function of a logic circuit is described without being aware of clocks to an RTL description (hereinafter, sometimes simply referred to as an "RTL") in which the function between registers is described based on clocks. The RTL includes therein a description of a data path unit that performs various kinds of computation performed in order to implement processes and a description of a state machine unit that performs control of determining which computation unit in the data path unit is to be operated at which timing.

Furthermore, if the behavioral synthesis device 1 creates an RTL, the behavioral synthesis device 1 compares, without performing the timing analysis of the RTL, a set value based on the RTL, i.e., a value based on various kinds of information indicating the performance or the attribute of a circuit targeted for the design, with a reference value that is specified by a user. Then, if the set value exceeds the reference value, the behavioral synthesis device 1 divides a state machine in the circuit indicated by the RTL into a plurality of state machines and again performs the behavioral synthesis.

In the following, an example of a process performed by each of the functions configured in the behavioral synthesis device 1 will be described. In a description below, a description of a state machine unit created by the behavioral synthesis device 1 may sometimes be referred to as a state machine created by the behavioral synthesis device 1.

Figure 2:
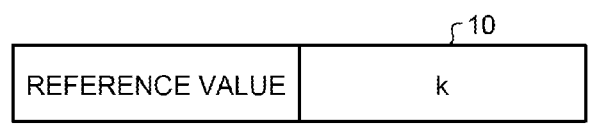
FIG. 2 is a schematic diagram illustrating an example of a reference value stored in a reference value storing unit according to the first embodiment.

The reference value storing unit 10 stores therein reference values that are previously specified. The reference value mentioned here is a value that is previously specified by a user of the behavioral synthesis device 1 and is a value that is used to specify a state machine created by the behavioral synthesis device 1 or specify the performance or the attribute of a circuit indicated by the RTL created by the behavioral synthesis device 1. For example, FIG. 2 is a schematic diagram illustrating an example of a reference value stored in a reference value storing unit according to the first embodiment. For example, the reference value storing unit 10 stores therein, as the reference value, the number of states "k" held in the state machine created by the behavioral synthesis device 1.

Figure 3:
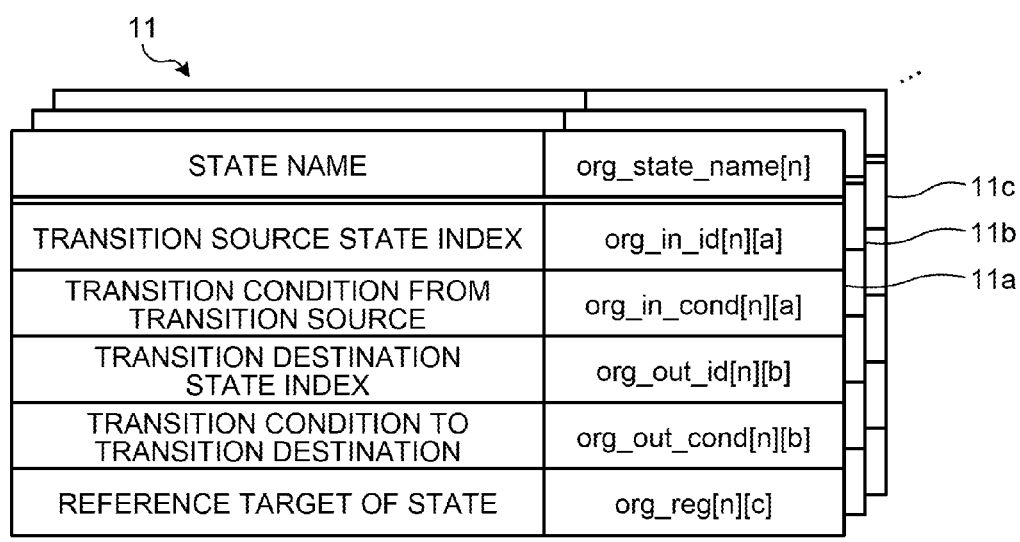
FIG. 3 is a schematic diagram illustrating an example of set values stored in the behavioral synthesis device according to the first embodiment.

A description will be given here by referring back to FIG. 1. The set value storing unit 11 stores therein the RTL in which the behavioral synthesis is performed from behavioral descriptions by the behavioral synthesis device 1. For example, FIG. 3 is a schematic diagram illustrating an example of set values stored in the behavioral synthesis device according to the first embodiment. In the example illustrated in FIG. 3, the set value storing unit 11 includes, as circuit information, pieces of information $11a$ to $11c$ that indicate various kinds of conditions of states for each state included in the state machine created by the behavioral synthesis device 1.

For example, the set value storing unit 11 stores therein, as the information $11a$ on an $n^{th}$ state, the state name "org_state_name[n]", the transition source state index "org_in_id[n][a]", and the transition condition from the transition source "org_in_cond[n][a]". Furthermore, the set value storing unit 11 stores therein, as the information $11a$ on the $n^{th}$ state, the transition destination state index "org_out_id[n][b]", the transition condition to the transition destination "org_out_cond[n][b]", and the reference target of the state "org_reg[n][c]".

The state name "org_state_name[n]" mentioned here is information for specifying a state and is information indicating that, for example, the information $11a$ is the $[n]^{th}$ state. Furthermore, the transition source state index "org_in_id[n][a]" is information indicating that the state that becomes the transition source of the $[n]^{th}$ state is an $[a]^{th}$ state. Furthermore, the transition condition from the transition source "org_in_cond[n][a]" is information indicating that the condition for transition from the $[a]^{th}$ state to the $[n]^{th}$ state in the transition source.

Furthermore, the transition destination state index "org_out_id[n][b]" is information indicating that the state that becomes the transition destination of the [n]$^{th}$ state is the [b]$^{th}$ state. Furthermore, the transition condition to the transition destination "org_out_cond[n][b]" is information indicating the condition for transiting from the [n]$^{th}$ state that becomes the transition source to the [b]$^{th}$ state. Furthermore, the reference target for the state "org_reg[n][c]" is information indicating a register that indicates the transition of a state and is information indicating that, for example, the reference target for the [n]$^{th}$ state is the [c]$^{th}$ register.

Furthermore, although not illustrated in FIG. 3, it is assumed that, in addition to the information on the state machines, information on the data path units that perform computation is also stored in the set value storing unit 11. For example, the set value storing unit 11 stores therein, as information on the data path units, the number of computation units that perform computation, flip-flops (FFs) that hold the outputs of the computation units, multiplexers that input signals to the computation units, demultiplexers that output the outputs from the computation units to the FFs, or the like. Furthermore, in the set value storing unit 11, the connection relations between the computation units, the FFs, the multiplexers, and the demultiplexers in the data path units; the register numbers that are the reference source of the multiplexers and the demultiplexer; or the like are registered.

A description will be given here by referring back to FIG. 1. The division result storing unit 12 stores therein information on state machines divided by the behavioral synthesis device 1. For example, FIG. 4 is a schematic diagram illustrating an example of information on divided state machines stored in the behavioral synthesis device according to the first embodiment. Furthermore, FIG. 4 illustrates an example of a case in which the behavioral synthesis device 1 divides a state machine into a main state machine that is a state machine functioning as the main machine and a sub state machine that is a dependent state machine that depends on the main state machine and in which transition occurs.

For example, in the example illustrated in FIG. 4, the division result storing unit 12 stores therein pieces of information 12a to 12c on the states for each state in the main state machines and pieces of information 12d to 12f on the states for each state in the sub state machines. In the first embodiment, it is assumed that the division result storing unit 12 stores therein the information on the states held by the main state machines and the sub state machines; however, different storing units may also store therein the information on each of the states for each main state machine and the sub state machine.

For example, the division result storing unit 12 stores therein, as the information 12a on an [m]$^{th}$ state held in the main state machine, the state name "main_state_name[m]", the transition source state index "main_in_id[m][a]", and transition condition from the transition source "main_in_cond[m][a]". Furthermore, the division result storing unit 12 stores therein, as the information 12a on the [m]$^{th}$ state, the transition destination state index "main_out_id[m][b]", and the transition condition to the transition destination "main_out_cond[m][b]".

Furthermore, the division result storing unit 12 stores therein the state name "sub_state_name[m][k+1]" as the information 12d on a [k+1]$^{th}$ state held in the sub state machine belonging to the [m]$^{th}$ state held in the main state machine. Furthermore, the division result storing unit 12 stores therein, as the information 12d, the transition source state index "sub_in_id[m][k+1][a]", the transition condition from the transition source "sub_in_cond[m][k+1][a]", and the transition destination state index "sub_out_id[m][k+1][b]". Furthermore, the division result storing unit 12 stores therein, as the information 12d, transition condition to the transition destination "sub_out_cond[m][k+1][b]", and the reference target for the state [sub_reg[m][k+1][c]].

A description will be continued here by referring back to FIG. 1. The input unit 20 receives an input of a reference value specified by a user of the behavioral synthesis device 1. For example, in the example illustrated in FIG. 1, the input unit 20 receives, as a reference value, the number of states included in the state machine created by the behavioral synthesis device 1. In such a case, the input unit 20 stores the received reference value in the reference value storing unit 10.

Furthermore, the input unit 20 receives a behavioral description that is converted to the RTL. The behavioral description may also be a behavioral description created by an editing function in the input unit 20 or read from another device, a recording medium, or the like. Furthermore, if the input unit 20 receives a behavioral description, the input unit 20 outputs the received behavioral description to the behavioral synthesis unit 21 and allows the behavioral synthesis unit 21 to perform the behavioral synthesis process. The input unit 20 is implemented by a device, such as a mouse, a keyboard, or the like, that receives an operation performed by a user.

By using the behavioral description received by the input unit 20, the behavioral synthesis unit 21 performs the behavioral synthesis process that creates the RTL and then registers the created RTL in the set value storing unit 11. For example, FIG. 5 is a schematic diagram illustrating an example of a process performed by a behavioral synthesis unit according to the first embodiment. As illustrated in FIG. 5, when the behavioral synthesis unit 21 receives the behavioral description, the behavioral synthesis unit 21 sets the scheduling and the resource/sharing from the behavioral description and performs, based on the result of the setting, the behavioral synthesis that creates a data path and a state machine. Then, the behavioral synthesis unit 21 creates, based on the result of the behavioral synthesis, the RTL of the circuit that implements the operation indicated by the behavioral description.

Here, FIG. 6 is a schematic diagram illustrating an example of a behavioral synthesis process. For example, as indicated by (A) illustrated in FIG. 6, the behavioral synthesis unit 21 receives, without being aware of the operation timing of the circuit, such as a clock, a behavioral description in which the function of the logic circuit is described. In such a case, as indicated by (B) illustrated in FIG. 6, in order to implement an operation, the behavioral synthesis unit 21 sets the scheduling that determines which computation is to be performed at which timing. For example, in the example illustrated in FIG. 6, the behavioral synthesis unit 21 sets the scheduling in which the computation is performed at a latency of 3 cycles. Furthermore, as indicated by (C) illustrated in FIG. 6, the behavioral synthesis unit 21 performs the resource/sharing that sets the computation in which a computation unit is shared. For example, in the example illustrated in FIG. 6, the behavioral synthesis unit 21 performs the setting such that the integration performed in the first cycle and the second cycle is performed in the same computation unit and the sum performed in the second cycle and the third cycle is performed in the same computation unit.

Then, as indicated by (D) illustrated in FIG. 6, the behavioral synthesis unit 21 creates the data paths and the state machines based on the results of the scheduling and the resource/sharing. For example, based on the result of the resource/sharing, the behavioral synthesis unit 21 creates a data path unit that implements a computation process. Furthermore, based on the scheduling, the behavioral synthesis unit 21 creates a state machine unit that controls the multiplexer and the demultiplexer included in the data path unit. Then, the behavioral synthesis unit 21 registers the RTL that indicates the created data paths and the state machines in the set value storing unit 11.

The determining unit 22 compares the design value registered in the set value storing unit 11 with the reference value registered in the reference value storing unit 10. For example, if the number of states held in the state machine is set as the reference value, the determining unit 22 specifies, as the set value from the RTL registered in the set value storing unit 11, the number of states held in the state machine. Then, the determining unit 22 determines whether the specified set value exceeds the reference value. If the set value exceeds the reference value, the determining unit 22 outputs, to the dividing unit 23, the RTL of the state machine, the reference value, and the design value stored in the set value storing unit 11. In contrast, if the specified set value is equal to or less than the reference value, the determining unit 22 outputs the RTL registered in the set value storing unit 11 to the output unit 24.

If the design value exceeds the reference value, the dividing unit 23 divides the state machine into a plurality of state machines. For example, the dividing unit 23 receives the RTL of the state machine from the determining unit 22. Then, if the number of states held in the state machine is set as the reference value, by distributing each of the states in the state machine, the dividing unit 23 divides the state machine into a main state machine and sub state machines. More specifically, the dividing unit 23 divides the state machine into a sub state machine that holds the same number of states as the reference value and a main state machine that holds the same number of states as the value obtained by rounding up a value obtained by dividing the design value by the reference value.

Then, the dividing unit 23 creates an RTL that indicates main state machines and sub state machines, i.e., the information 12a to 12f, and registers the created information in the division result storing unit 12. In such a case, the behavioral synthesis unit 21 acquires the information 12a to 12f registered in the division result storing unit 12. Then, the behavioral synthesis unit 21 modifies the RTL such that control is performed by the main state machine and the sub state machine indicated by the acquired information 12a to 12f and registers the modified RTL in the set value storing unit 11. Consequently, because the set value of the modified RTL satisfies the reference value, the determining unit 22 outputs the modified RTL to the output unit 24.

In the following, an example of the process in which the dividing unit 23 divides a state machine into a main state machine and sub state machines will be described with reference to FIG. 7. FIG. 7 is a schematic diagram illustrating a process in which the behavioral synthesis device according to the first embodiment divides a state machine. In the example illustrated in FIG. 7, the state machine is represented by using ST1 to STn that are n states held in the main state machine and by using the arrows that indicate the transition of each of the states.

For example, the dividing unit 23 acquires the RTL of the state machine that holds the states ST1 to STn indicated by (E) illustrated in FIG. 7. In such a case, the dividing unit 23 divides, by following along the sequence of the states, the states held in the state machine into a plurality of groups in which the number of states is equal to or less than the reference value. For example, if the value of reference value is "k", as indicated by (F) illustrated in FIG. 7, the dividing unit 23 divides the states into ST1 to STk, STk+1 to ST2$k$, ST2$k$+1 . . . ST(m-1)k, and ST(m-1)k+1 to STn.

Then, the dividing unit 23 specifies the transition condition of the states divided into the different groups. For example, the dividing unit 23 specifies, the reset release time at which transition to the ST1 is performed, a transition condition A that is used for the transition from the STk to the STk+1, and a transition condition B that is used for the transition from the ST2$k$ to the St2$k$+1. Furthermore, the dividing unit 23 specifies a transition condition C that is used for the transition from the ST(m-1)k to the ST(m-1)k+1 and a transition condition D that is used for the transition from the STn to the ST1. Furthermore, the dividing unit 23 specifies a transition condition between the states across over the groups, for example, a transition condition Z that is used for the transition from the ST2$k$-1 to the ST2.

Then, the dividing unit 23 adds an idle state to each group and changes, to the idle state, the transition source of the state located the uppermost stream from among the states included in the group. Furthermore, the dividing unit 23 changes, to the idle state, the transition destination of the state located in the most downstream from among the states included in the group. Furthermore, the dividing unit 23 changes the transition destination of the transition condition, such as a transition condition Z, in which transition occurs in the state over the groups to the idle state included in the same group. Consequently, the dividing unit 23 creates a plurality of sub state machines in each of which the number of substantial states is equal to or less than the reference values of k.

Furthermore, the dividing unit 23 calculates a value obtained by rounding up a value obtained by dividing the set value by the reference value and creates the main state machine that holds the same number of states as the calculated value. Then, the dividing unit 23 sets, as the transition condition of each of the states held in the main state machine, a condition at the division portion used when the states in the state machine are divided into a plurality of groups. Namely, the dividing unit 23 associates each of the states in the main state machine with each of the sub state machines. Furthermore, regarding the transition condition for the transition of the states over the groups, the dividing unit 23 specifies a sub state machine in the corresponding group and sets the transition condition between the states in the specified sub state machine.

Consequently, as indicated by (G) illustrated in FIG. 7, the dividing unit 23 divides the state machine into the main state machine and the plurality of the sub state machines. For example, in the example illustrated in FIG. 7, the dividing unit 23 creates the main state machine that holds m states indicated by Main_ST1 to Main STm and that transit under the transition condition A to the transition condition D, and the transition condition Z.

Furthermore, the dividing unit 23 creates a sub state machine Sub1 that transits from the idle state to another state under the transition condition D or the transition condition Z and that returns to the idle state under the transition condition A. Furthermore, the dividing unit 23 creates a sub state machine Sub2 that transits from the idle state to another state under the transition condition A and that returns to the idle state under the transition condition B or the transition condition Z. Furthermore, the dividing unit 23 creates a sub state machines Subm that transits from the idle state to another state under the transition condition C and that returns to the idle state under the transition condition D. Furthermore, it is assumed that, in addition to these sub state machines, the dividing unit 23 also creates a sub state machine that holds the states divided from the state machine that is the division source.

A description will be given here by referring back to FIG. 1. The output unit 24 outputs the RTL in which the set value satisfies the reference value. For example, when the output unit 24 receives the RTL from the determining unit 22, the output unit 24 outputs the RTL without processing anything or outputs a circuit diagram or the like based on the RTL. For example, the output unit 24 is implemented by an information output device, such as a printer, a monitor, or the.

As described above, if the set value for the circuit information in the RTL subjected to the behavioral synthesis exceeds the set reference value, the behavioral synthesis device 1 divides the state machine and modifies the RTL such that the set value for the circuit information falls below the reference value. Consequently, because the behavioral synthesis device 1 can output the RTL of a circuit desired by a user without the user modifying the behavioral description based on the result of the timing analysis of the RTL, the time taken to design a circuit can be reduced.

Figure 8:
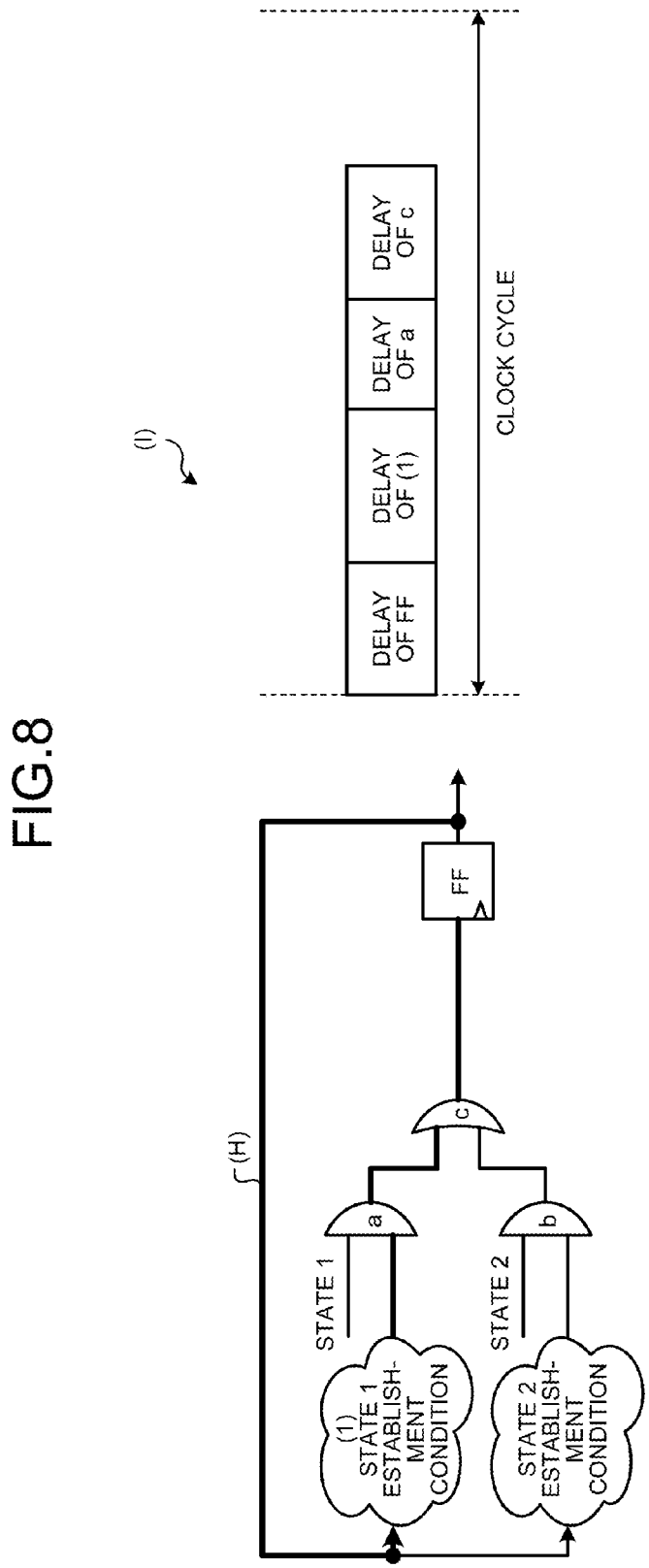
FIG. 8 is a schematic diagram illustrating an example of a delay due to the number of states.

In the following, an advantage of the behavioral synthesis device 1 will be described with reference to the drawings. FIG. 8 is a schematic diagram illustrating an example of a delay due to the number of states. For example, the state machine illustrated in FIG. 8 holds two states. In such a case, if an establishment condition of a state 1 has been established, the state machine outputs a value that indicates the state 1 via the thick-line path indicated by (H) illustrated in FIG. 8. Consequently, the state machine illustrated in FIG. 8 has, as indicated by (I) illustrated in FIG. 8, a delay that is the sum of a delay of the FF that holds a value of the state, a delay of (1) that is the establishment condition of the state 1, and the delays of the AND circuit a and the OR circuit c. If this delay fits within a clock cycle, the state machine does not become a problem in terms of the operation timing of the circuit.

Figure 9:
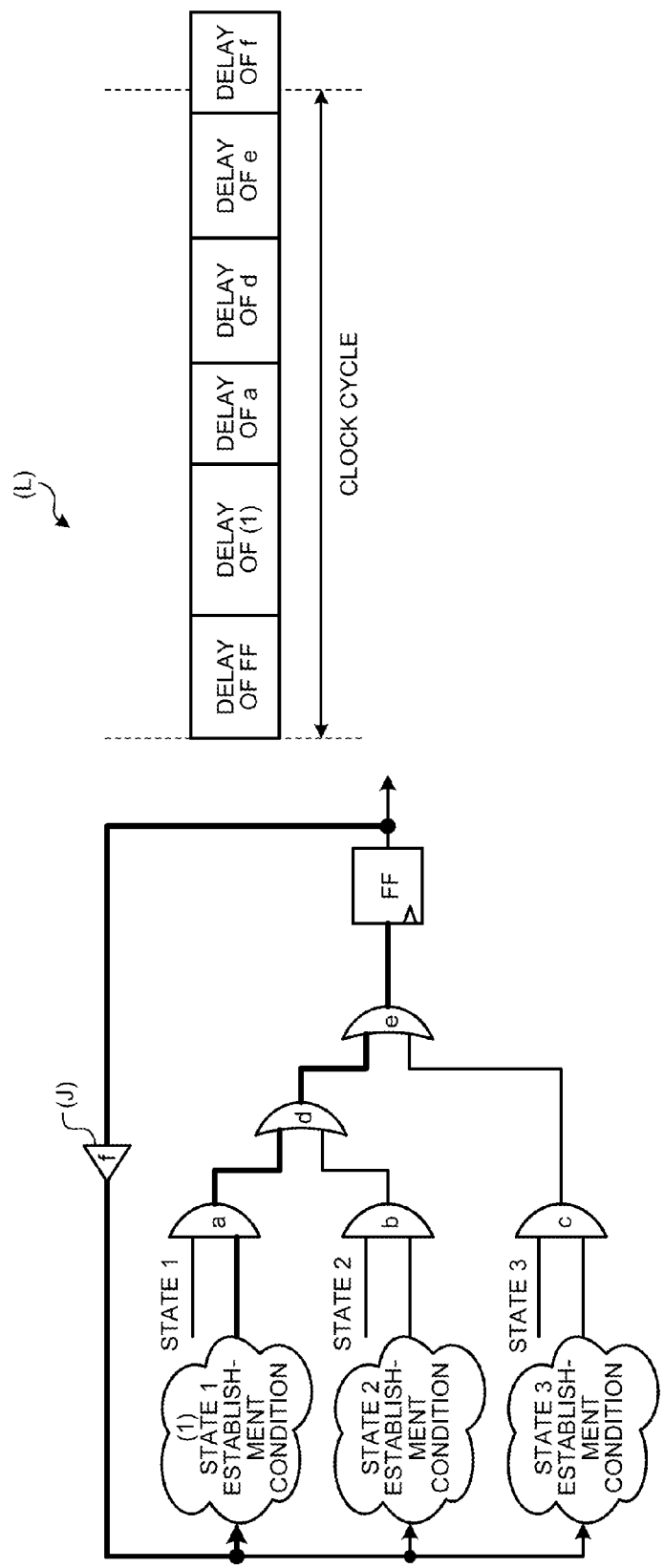
FIG. 9 is a schematic diagram illustrating an example of a delay that occurs when the number of states is increased.

In contrast, FIG. 9 is a schematic diagram illustrating an example of a delay that occurs when the number of states is increased. For example, the state machine illustrated in FIG. 9 holds three states. In such a case, the state machine outputs a value that indicates the state 1 via the path indicated by the thick line illustrated in FIG. 9. Here, the state machine illustrated in FIG. 9 holds the states, the number of which is greater than that of the state machine illustrated in FIG. 8; therefore, the size of the circuit becomes large. Consequently, because the path indicated by the thick line illustrated in FIG. 9 is longer than the path indicated by (H) illustrated in FIG. 8, as indicated by (J) illustrated in FIG. 9, a buffer f is installed in order to hold signals. Consequently, as indicated by (L) illustrated in FIG. 9, the state machine illustrated in FIG. 9 has a delay that is the sum of a delay of the FF that holds a value of the state, a delay of (1) that is the establishment condition of the state 1, and the delays of the AND circuit a, an OR circuit d, an OR circuit e, and the buffer f. Consequently, because the delay does not fit within the clock cycle, the state machine becomes a problem in terms of the operation timing of the circuit.

Figure 10:
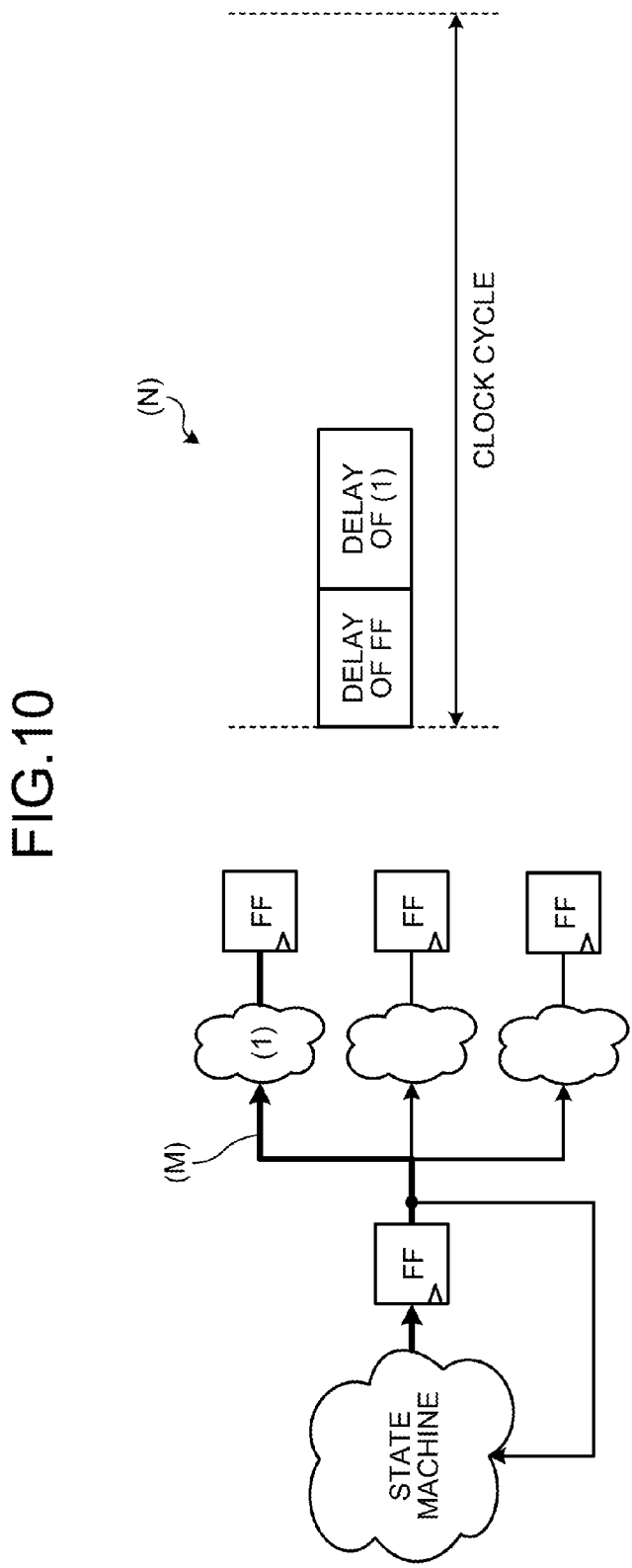
FIG. 10 is a schematic diagram illustrating an example of a delay due to the number of reference targets of a state.

FIG. 10 is a schematic diagram illustrating an example of a delay due to the number of reference targets of a state. For example, the state machine illustrated in FIG. 10 includes three reference targets. In such a case, as indicated by (M) illustrated in FIG. 10, an output of the state machine is distributed to, via a single FF, FFs that are used by the reference targets to refer to the state machine. Consequently, as indicated by (N) illustrated in FIG. 10, the state machine illustrated in FIG. 10 has a delay that is the sum of a delay of the FF that holds the output of the state machine and a delay of a path (1) from this FF to the FF that is used to be referred to by the reference target.

Figure 11:
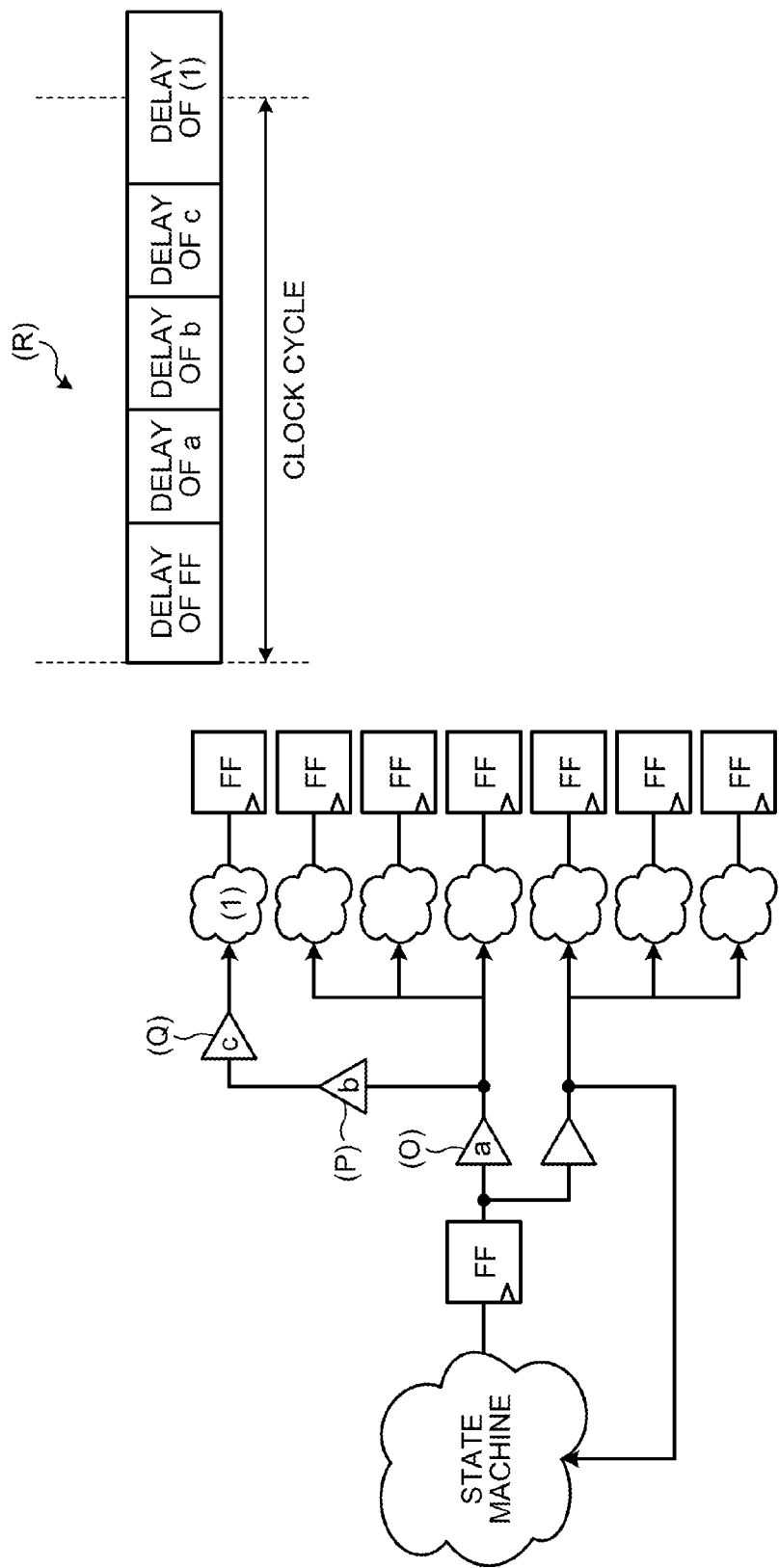
FIG. 11 is a schematic diagram illustrating an example of a delay that occurs when the number of reference targets of the state is increased.

In contrast, FIG. 11 is a schematic diagram illustrating an example of a delay that occurs when the number of reference targets of the state is increased. For example, the state machine illustrated in FIG. 11 has seven reference targets. In such a case, because there may possibly be a case in which each of the FFs referred to by the reference targets is not able to be operated by the output of only a single FF, as indicated by (O) illustrated in FIG. 11, a buffer a is added. Furthermore, in the example illustrated in FIG. 11, because the placement positions of the FFs referred to by the reference targets are away from the FF that holds the output of the state machine due to the increase in the reference targets, a buffer b and a buffer c are added. In such a case, as indicated by (R) illustrated in FIG. 11, in addition to the delay that is the sum of the delay of the FF that holds the output of the state machine and the delay of the path (1) from the subject FF to the FF that is referred to by the reference target, the state machine illustrated in FIG. 11 has a delay that is the sum of a delay of each of the buffers a to c. Consequently, because the delay does not fit within the clock cycle, the state machine becomes a problem in terms of the operation timing of the circuit.

As described above, if the number of states or reference targets in the state machine is increased, the state machine itself becomes a problem in terms of the operation timing of the circuit. Accordingly, the behavioral synthesis device 1 divides the state machine into a plurality of state machines and thus reduces the number of states or reference targets for each state machine.

Furthermore, whether or not the state machine becomes a problem in terms of the operation timing of the circuit can be specified from the timing analysis of the RTL. Accordingly, if a state machine is found to become a problem based on the timing analysis of the RTL or the analysis obtained at the time of installation, it is conceivable to use a method of reducing the number of states or reference targets for each state machine by reconsidering a behavioral description and dividing an automatically created state machine.

Figure 12:
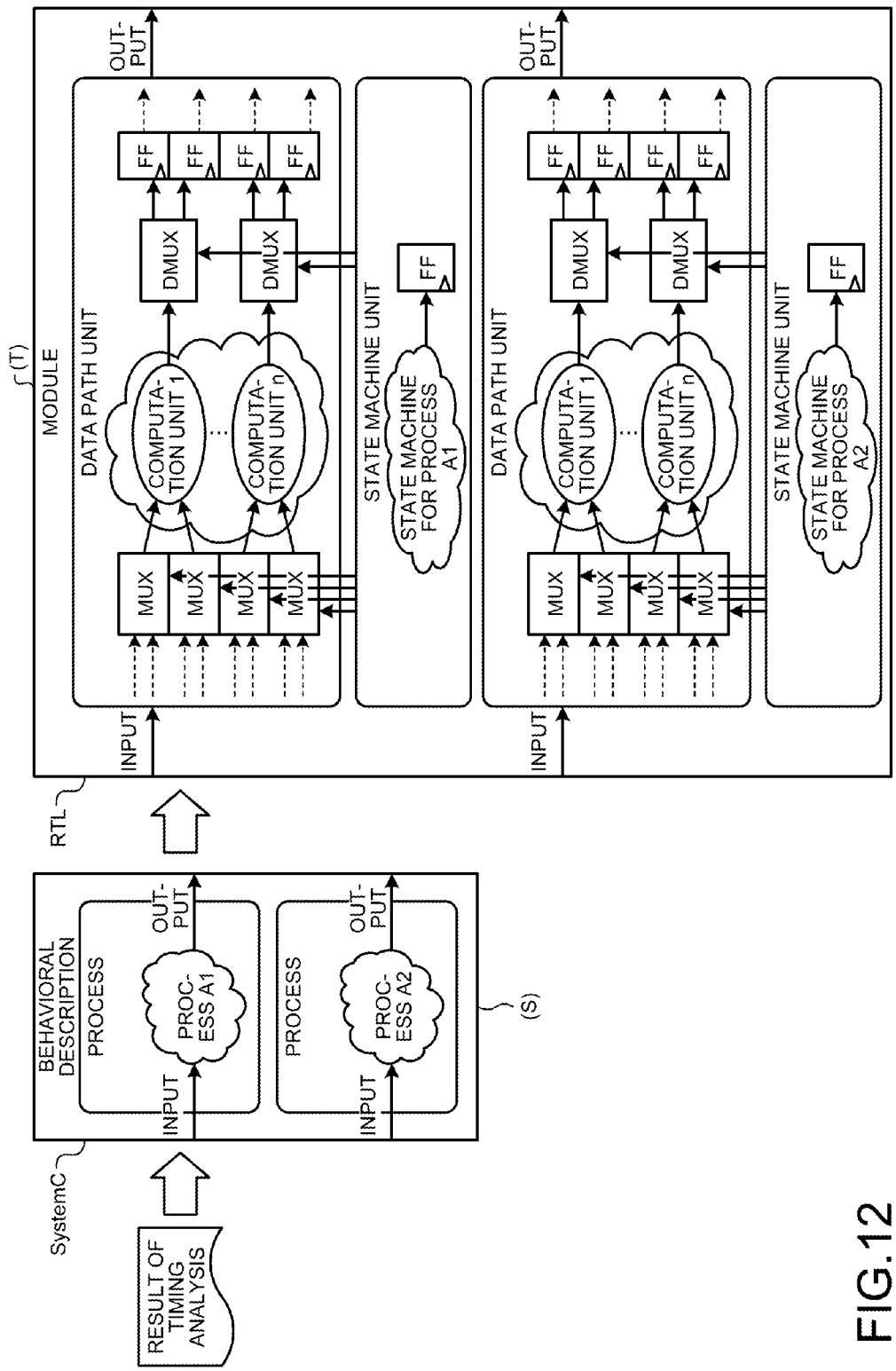
FIG. 12 is a schematic diagram illustrating an example of a process of reviewing a behavioral description and dividing a state machine.

For example, FIG. 12 is a schematic diagram illustrating an example of a process of reviewing a behavioral description and dividing a state machine. In the example illustrated in FIG. 12, if the state machine becomes a problem in terms of the timing as the result of the timing analysis of the RTL created from the behavioral description of the process A, a user newly creates, as indicated by (S) illustrated in FIG. 12, a behavioral description in which the process A is divided into a process A1 and a process A2. Consequently, as indicated by (T) illustrated in FIG. 12, the behavioral synthesis system outputs the RTL of the module that includes a data path unit and the state machine unit that perform the process A1 and data path unit and the state machine unit that perform the process A2. However, if a user recreates a behavioral description based on the result of the timing analysis, the time taken to design the circuit may possibly be increased.

Figure 13:
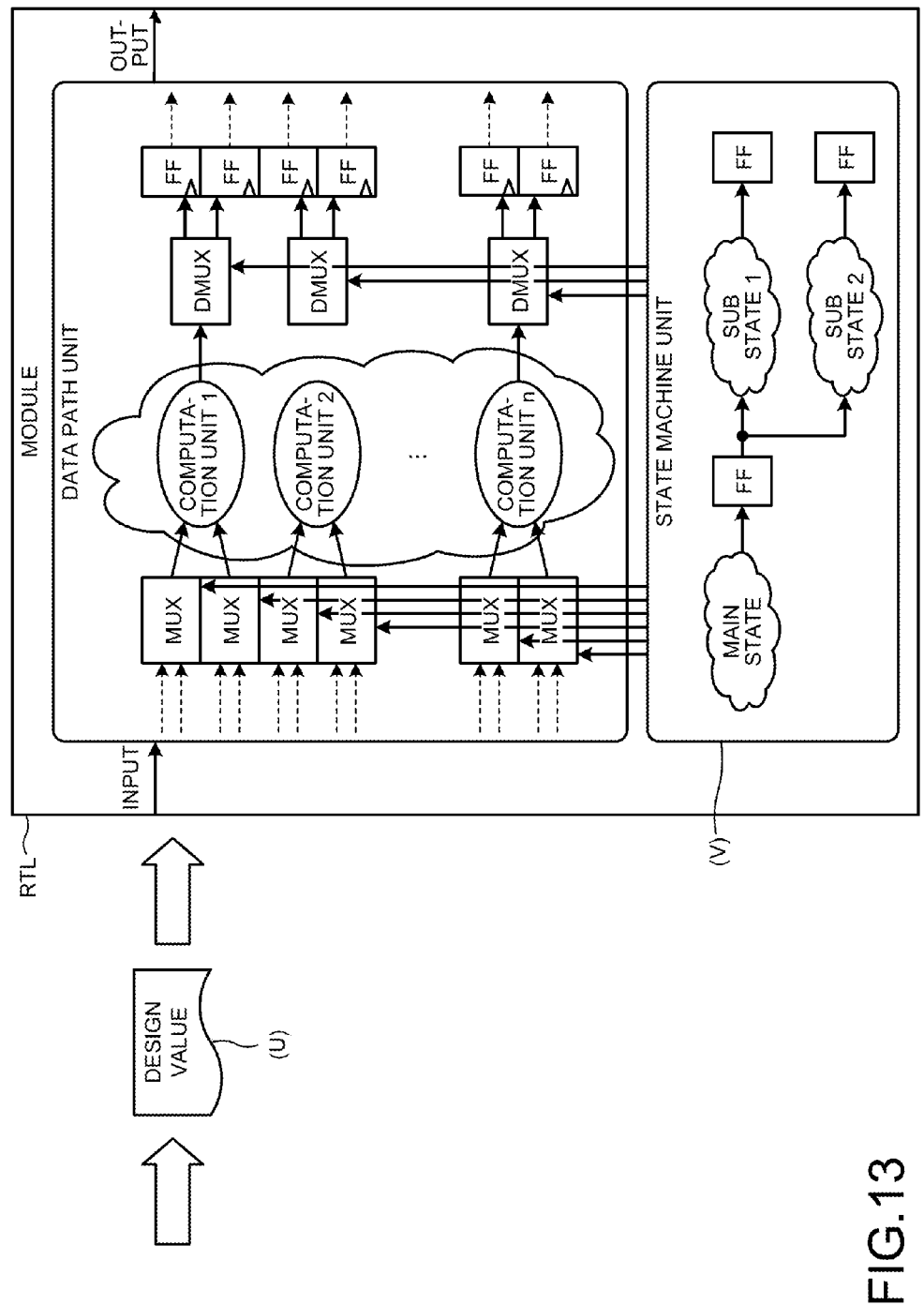
FIG. 13 is a schematic diagram illustrating a process performed by the behavioral synthesis device according to the first embodiment.

In contrast, FIG. 13 is a schematic diagram illustrating a process performed by the behavioral synthesis device according to the first embodiment. For example, as indicated by (U) illustrated in FIG. 13, instead of the result of the timing analysis of the RTL, the behavioral synthesis device 1 focuses on a design value that is the circuit information on the RTL and divides the state machine. Specifically, if the design value exceeds the reference value, the behavioral synthesis device 1 determines that the created state machine possibly become a problem in terms of the operation timing of the circuit. Consequently, as indicated by (V) illustrated in FIG. 13, the behavioral synthesis device 1 modifies the RTL and divides the state machine into the main state machine and the sub state machines. Consequently, because the behavioral synthesis device 1 can solve the problem of the state machine without modifying the timing analysis of the RTL or the behavioral description, the time taken to design the circuit can be reduced.

Figure 14:
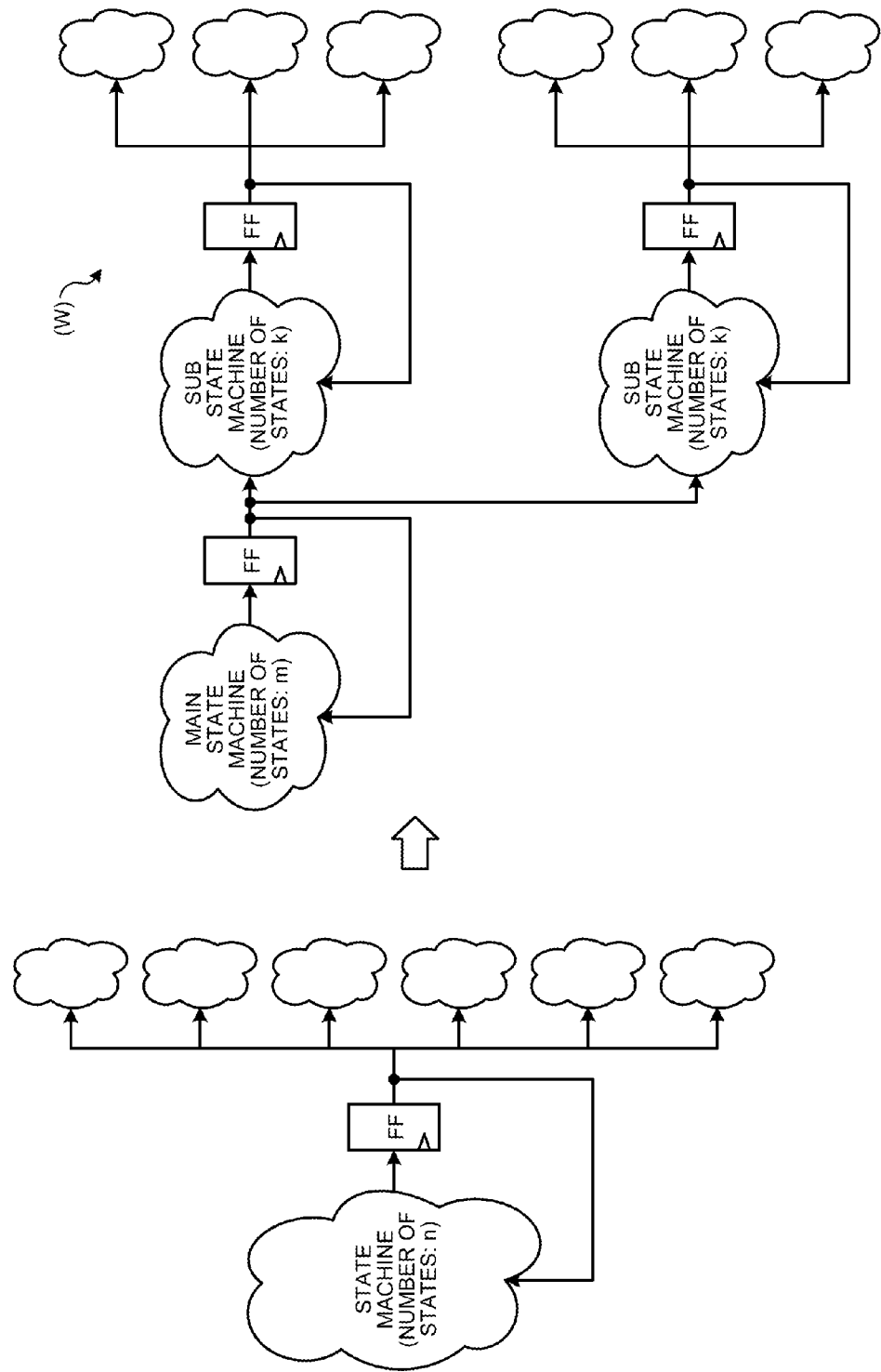
FIG. 14 is a schematic diagram illustrating the effect obtained by dividing a state machine.

Here, FIG. 14 is a schematic diagram illustrating the effect obtained by dividing a state machine. For example, in the example illustrated in FIG. 14, the behavioral synthesis device 1 divides the state machine that holds n states into a plurality of sub state machines each holding k states and the main state machine that holds m states. Here, the value "m" is obtained by rounding up a value that is obtained by dividing the number of states "n" that is included in the state machine and that is a design value by the value "k" that is the reference value.

If this division is performed, the behavioral synthesis device 1 reduces the number of states in the main state machine and the sub state machines. Consequently, the wiring of the main state machine and the sub state machines are shortened and, consequently, a buffer that compensates signals is not needed. Furthermore, as indicated by (W) illustrated in FIG. 14, by dividing the state machine, the behavioral synthesis device 1 reduces the number of reference targets in each of the state machines. Consequently, because the buffers that compensate signals of the sub state machines or the buffers that drive FFs for the reference targets are not needed, the behavioral synthesis device 1 can fit a delay of the state machine within a clock cycle.

Furthermore, the behavioral synthesis unit 21, the determining unit 22, and the dividing unit 23 may also be implemented by electronic circuits or the like. Example of the electronic circuit used here include integrated circuits, such as application specific integrated circuits (ASICs) or field programmable gate arrays (FPGAs), central processing units (CPUs), or micro processing units (MPUs).

Furthermore, the reference value storing unit 10, the set value storing unit 11, and the division result storing unit 12 are storage devices. Examples of the storage devices include semiconductor memory devices, such as random access memories (RAMs), read only memories (ROM), flash memories, or the like.

Figure 15:
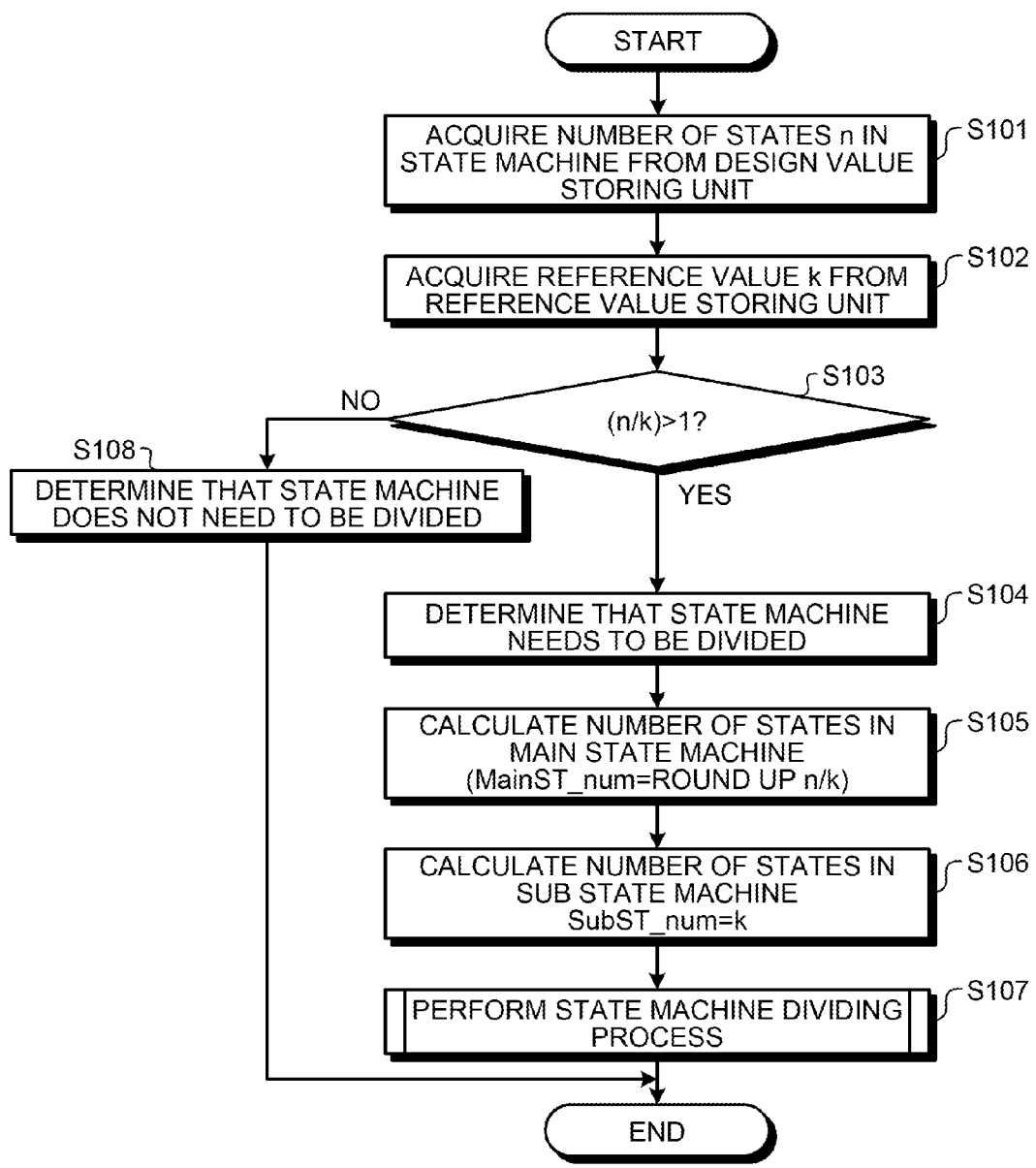
FIG. 15 is a flowchart illustrating the flow of a process performed by the behavioral synthesis device according to the first embodiment.

In the following, an example of the flow of a process performed by the behavioral synthesis device 1 will be described with reference to FIG. 15. FIG. 15 is a flowchart illustrating the flow of a process performed by the behavioral synthesis device according to the first embodiment. First, the behavioral synthesis device 1 acquires, from the set value storing unit 11, the number of states n in the state machine (Step S101). Then, the behavioral synthesis device 1 acquires the reference value k from the reference value storing unit 10 (Step S102). Then, the behavioral synthesis device 1 determines whether the value obtained by dividing n by k is equal to or greater than 1 (Step S103). Namely, the behavioral synthesis device 1 determines whether n exceeds k.

Here, if the value obtained by dividing n by k is equal to or greater than 1 (Yes at Step S103), i.e., n exceeds k, the behavioral synthesis device 1 determines that the state machine needs to be divided (Step S104). Furthermore, the behavioral synthesis device 1 calculates the number of states in the main state machine (Step S105). Specifically, the behavioral synthesis device 1 sets the value obtained by rounding up n/k to the number of states MainST_num in the main state machine.

Furthermore, the behavioral synthesis device 1 calculates the number of states in the sub state machine (Step S106). Specifically, the behavioral synthesis device 1 sets the reference value k to the number of states SubST_num in the sub state machine. Then, the behavioral synthesis device 1 performs the state machine dividing process that divides the state machine (Step S107) and ends the process. In contrast, if a value obtained by dividing n by k is equal to or less than 1 (No at Step S103), i.e., n is equal to or less than k, the behavioral synthesis device 1 determines that the state machine does not need to be divided (Step S108) and ends the process.

Figure 16:
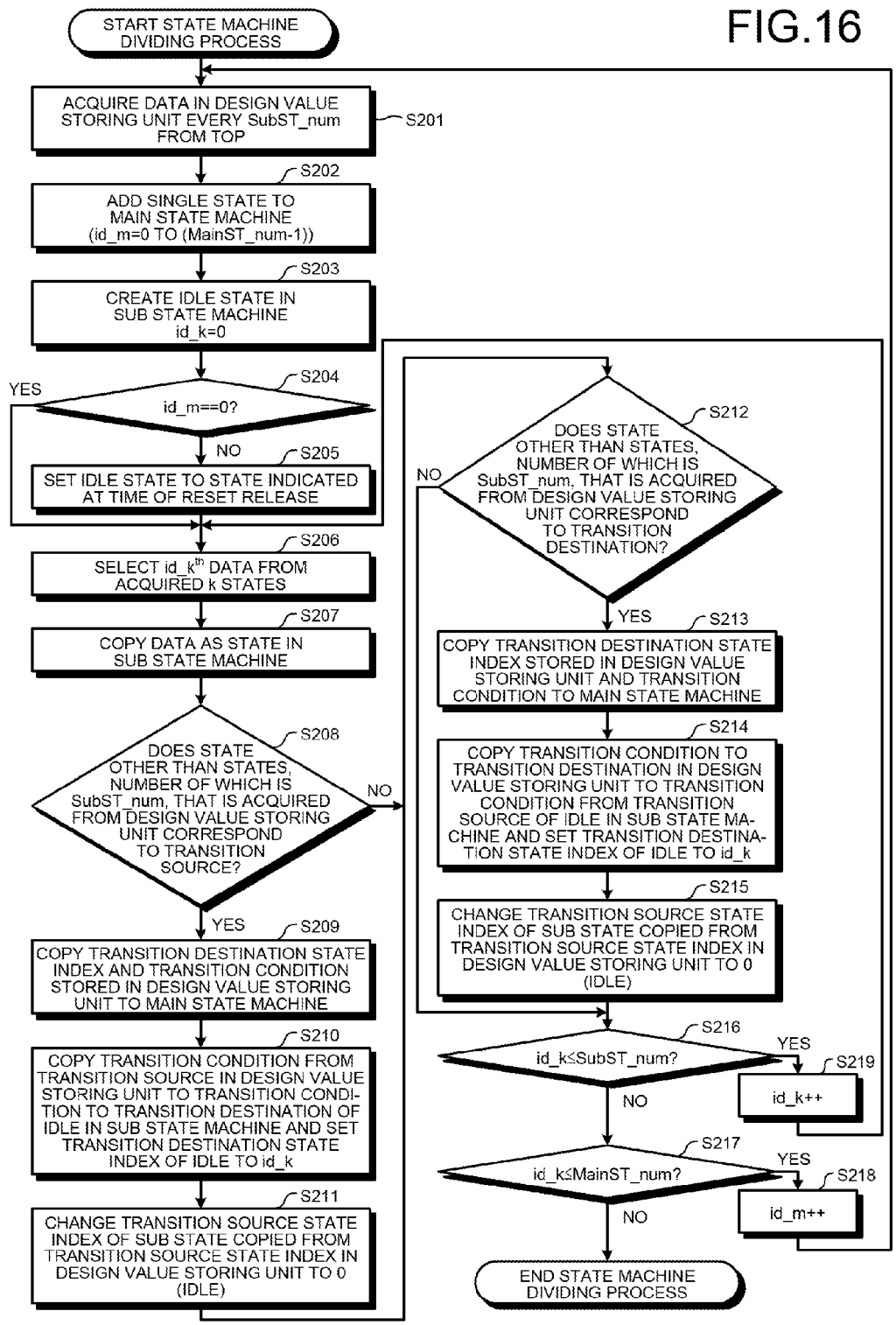
FIG. 16 is a flowchart illustrating the flow of dividing a state machine performed by the behavioral synthesis device according to the first embodiment.

In the following, an example of the flow of the state machine dividing process performed at Step S107 illustrated in FIG. 15 will be described with reference to FIG. 16. FIG. 16 is a flowchart illustrating the flow of dividing a state machine performed by the behavioral synthesis device according to the first embodiment. First, the behavioral synthesis device 1 acquires, every SubST_num in ascending numerical order, information about the states stored in the set value storing unit 11 (Step S201).

Then, the behavioral synthesis device 1 adds a single state to the main state machine (Step S202). For example, the behavioral synthesis device 1 sets id_m=0 to (MainST_num-1) as the information that indicates the states in the main state machine. Furthermore, the behavioral synthesis device 1 creates, as id_k=0, an IDLE state in each of the sub state machines (Step S203).

At this point, the behavioral synthesis device 1 determines whether id_m==0 is satisfied (Step S204). Namely, the behavioral synthesis device 1 determines whether a state is set in the main state machine. If id_m==0 is not satisfied (No at Step S204), the behavioral synthesis device 1 sets the IDLE state to the state indicated at the time of release of reset (Step S205). Then, the behavioral synthesis device 1 selects, from the acquired information about k states, the id_k$^{th}$ data (Step S206).

Then, the behavioral synthesis device 1 copies the selected data as the data in the sub state machine (Step S207). For example, the behavioral synthesis device 1 creates data in which "org" included in each piece of the information in the selected data is changed to "sub". Furthermore, the behavioral synthesis device 1 determines whether the transition source of the selected data is the state that is acquired at Step S201 (Step S208).

If the behavioral synthesis device 1 determines that the transition source of the selected data is not the state that is acquired at Step S201 (Yes at Step S208), the behavioral synthesis device 1 performs the following process. First, the behavioral synthesis device 1 copies both the transition source state index of the selected data and transition condition from the transition source as the information on the state in the main state machine indicated by id_m (Step S209). Then, the behavioral synthesis device 1 copies the transition condition from the transition source stored in the selected data to the transition condition to the transition destination of the idle state of the sub state machine and sets the transition destination state index of the idle state to id_k (Step S210).

Then, the behavioral synthesis device 1 sets the value of [a] of the transition source state index of the sub state machine that is copied from the transition source state index of the selected data to "0" (i.e., the idle state) (Step S211). Subsequently, the behavioral synthesis device 1 determines whether the transition destination of the selected data is the state other than the states acquired at Step S201 (Step S212).

Then, if the behavioral synthesis device 1 determines that the transition destination of the copy source of the selected data is the state other than the states acquired at Step S201 (Yes at Step S212), the behavioral synthesis device 1 performs the following process. First, the behavioral synthesis device 1 copies both the transition destination state index of the selected data and the transition condition to the transition destination as the state information on the main state machine (Step S213). Then, the behavioral synthesis device 1 copies the transition condition to the transition destination of the selected data to the transition condition from the transition source of the idle state in the sub state machine and sets the value of [b] of the transition destination state index of the idle state to the value of "id_k" (Step S214). Then, the behavioral synthesis device 1 sets [a] of the transition source state index of the sub state machine copied from the selected data to "0" (i.e., the idle state) (Step S215).

Then, the behavioral synthesis device 1 determines whether the value of id_k is equal to or less than the value of SubST_num (Step S216). If the value of id_k is greater than the value of SubST_num (No at Step S216), the behavioral synthesis device 1 determines whether the value of id_m is smaller than the value of MainST_num (Step S217). If the value of id_m is equal to or greater than the value of MainST_num (No at Step S217), the behavioral synthesis device 1 ends the process.

In contrast, if the value of id_m is smaller than the value of MainST_num (Yes at Step S217), the behavioral synthesis device 1 increments the value of id_m by 1 (Step S218) and again performs each of the processes from Step S201. Furthermore, if the value of id_m is equal to or less than the value of MainST_num (Yes at Step S216), the behavioral synthesis device 1 increments the value of id_k by 1 (Step S219) and again performs each of the processes from Step S206.

Furthermore, if the behavioral synthesis device 1 determines that the transition destination of the copy source of the selected data corresponds to one of the states acquired at Step S201 (No at Step S212), the behavioral synthesis device 1 skips the processes at Steps S213 to S215 and performs the process at Step S216. Furthermore, if the behavioral synthesis device 1 determines that the transition source of the selected data corresponds to one of the states acquired at Step S201 (No at Step S208), the behavioral synthesis device 1 skips the processes at Steps S209 to S211 and performs the process at Step S212. Furthermore, if id_m==0 is satisfied (Yes at Step S204), the behavioral synthesis device 1 skips the process at Step S205.

Advantage of the First Embodiment

As described above, the behavioral synthesis device 1 compares, by using a state machine, a design value that is based on an RTL of a circuit that controls the computation process with a predetermined reference value. If the design value exceeds the reference value, the behavioral synthesis device 1 divides the state machine into a plurality of state machines. Consequently, because the behavioral synthesis device 1 can create the RTL of the circuit in which the state machine does not become a problem in terms of the timing without modifying a behavioral description based on the timing analysis of the RTL, the time taken to design the circuit can be reduced.

Furthermore, for example, because the behavioral synthesis device 1 does not need to review the behavioral description, a behavioral description with a high abstraction level is possible, which makes it possible to reduce the Turn Around Time (TAT) or the simulation time of the design. Furthermore, the behavioral synthesis device 1 maintains the level of abstraction of the behavioral description and, consequently, the behavioral synthesis device 1 can allow a circuit having a different technology or operation frequencies to divert the behavioral description, whereby it is possible to improve the reuse of the behavioral description.

Furthermore, the behavioral synthesis device 1 divides a state machine into a sub state machine that holds the same number of states as the reference value and a main state machine that holds the same number of states as the value that is obtained by rounding up the value obtained by dividing the design value by the reference value. Consequently, the behavioral synthesis device 1 can reduce the number of states and the number of reference targets included in each of the state machines. Furthermore, because the behavioral synthesis device 1 reduces the dependency between the states, it is possible to improve the placement and wiring of a circuit. Consequently, the behavioral synthesis device 1 can prevent the state machine from becoming a problem in terms of timing.

Furthermore, the behavioral synthesis device 1 compares the design value that indicates the number of states included in the state machine with the reference value. Consequently, the behavioral synthesis device 1 can accurately determine whether dividing the state machine is appropriate.

[b] Second Embodiment

In the first embodiment described above, a description has been given of the behavioral synthesis device 1 that determines, based on the number of states that are held in the state machine, whether the state machine is divided. However, the embodiment is not limited thereto. In the following, as a second embodiment, another example of a process performed by the behavioral synthesis device will be described.

For example, a behavioral synthesis device 1a according to the second embodiment uses, as the design value and the reference value, the latency until a circuit completes a process or the number of operations that is the number of computations performed until the process has been completed. Furthermore, in an another example, the behavioral synthesis device 1a uses, as the design value and the reference value, the number of fanouts that is the number of times each state in the state machine is referred to.

Then, if the design value exceeds the reference value, the behavioral synthesis device 1a creates a main state machine that has the same number of states as a value obtained by rounding up a value that is obtained by dividing the design value by the reference value. Furthermore, the behavioral synthesis device 1a creates a sub state machine having the same number of states as the value obtained by rounding up the value that is obtained by dividing the number of states in the state machine by the number of states in the main state machine. However, the behavioral synthesis device 1a divides the state machine into the main state machine and the sub state machine only when the number of states in the sub state machine is equal to or greater than a predetermined value (for example, 4).

For example, the behavioral synthesis device 1a sets the number of operations in a process as the design value and the reference value. Here, if the design value is "1200", the reference value is "400", and the number of states in the state machine synthesized from a behavioral description is "24", the behavioral synthesis device 1a divides as follows. Namely, because the number of states in the main state machine is "1200/400=3" and the number of states in the sub state machine is "24/3=8", the behavioral synthesis device 1a divides the state machine.

In contrast, if the number of states in the state machine synthesized from the behavioral description is "9", the number of states in the main state machine is "1200/400=3" and the number of states in the sub state machine is "9/3=3". In such a case, even if the state machine is divided into the main state machine and the sub state machine, it is not able to reduce the number of states in the state machine and the reference targets. Consequently, the behavioral synthesis device 1a ends the process without dividing the state machine.

Figure 17:
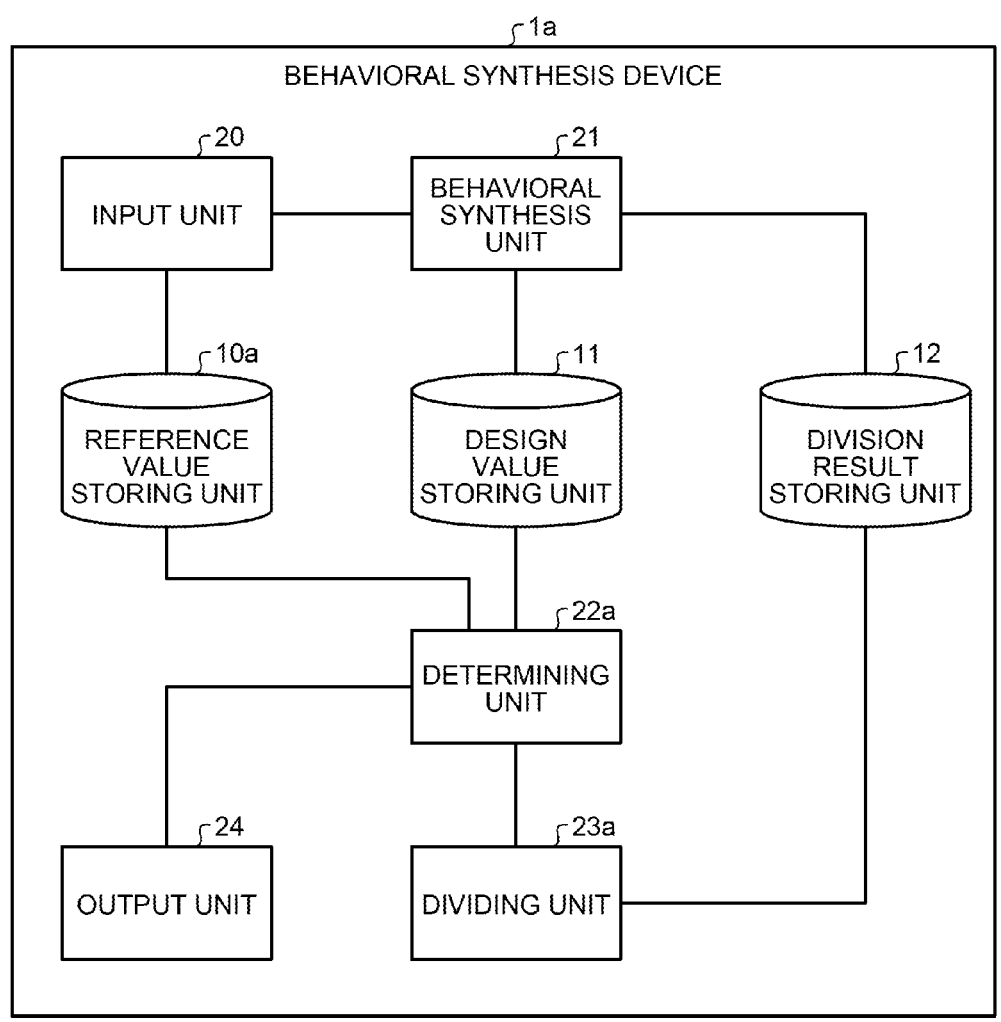
FIG. 17 is a schematic diagram illustrating an example of a functional configuration of a behavioral synthesis device according to a second embodiment.

FIG. 17 is a schematic diagram illustrating an example of a functional configuration of a behavioral synthesis device according to a second embodiment. In the example illustrated in FIG. 17, the behavioral synthesis device 1a includes a reference value storing unit 10a, the set value storing unit 11, a division result storing unit 12, the input unit 20, the behavioral synthesis unit 21, a determining unit 22a, a dividing unit 23a, and the output unit 24. Furthermore, in a description below, components having the same function as those described in the first embodiment are assigned the same reference numerals; therefore, descriptions thereof will be omitted.

The reference value storing unit 10a stores therein, as previously set reference values, a value of the latency, the number of operations, the number of fanouts, and the like. If the determining unit 22a acquires the reference value from the reference value storing unit 10a, the determining unit 22a acquires, from the set value storing unit 11, the set value that is the same type of information as the reference value. Then, if the set value exceeds the reference value, the determining unit 22a outputs the information stored in the set value storing unit 11 to the dividing unit 23a, whereas, if the set value does not exceeds the reference value, the determining unit 22a outputs the information stored in the set value storing unit 11 to the output unit 24.

If the value obtained by dividing the number of states held in the state machine by the value that is obtained by dividing the design value by the reference value is smaller than a predetermined threshold, the dividing unit 23a ends the process without dividing the state machine. In contrast, if the value obtained by dividing the number of states held in the state machine by the value that is obtained by dividing the design value by the reference value is equal to or greater than the predetermined threshold, the dividing unit 23a divides the state machine. Namely, the dividing unit 23a creates a main state machine that has the same number of states as a value obtained by rounding up the value that is obtained by dividing the design value by the reference value. Furthermore, the dividing unit 23a creates a sub state machine that has the same number of states as a value obtained by rounding up the value that is obtained by dividing the number of states held in the state machine by the number of states held in the main state machine.

Furthermore, it is assumed that the process of dividing the state machine performed by the dividing unit 23a is implemented by the same process as that performed by the dividing unit 23; therefore, a description thereof will be omitted.

Figure 18:
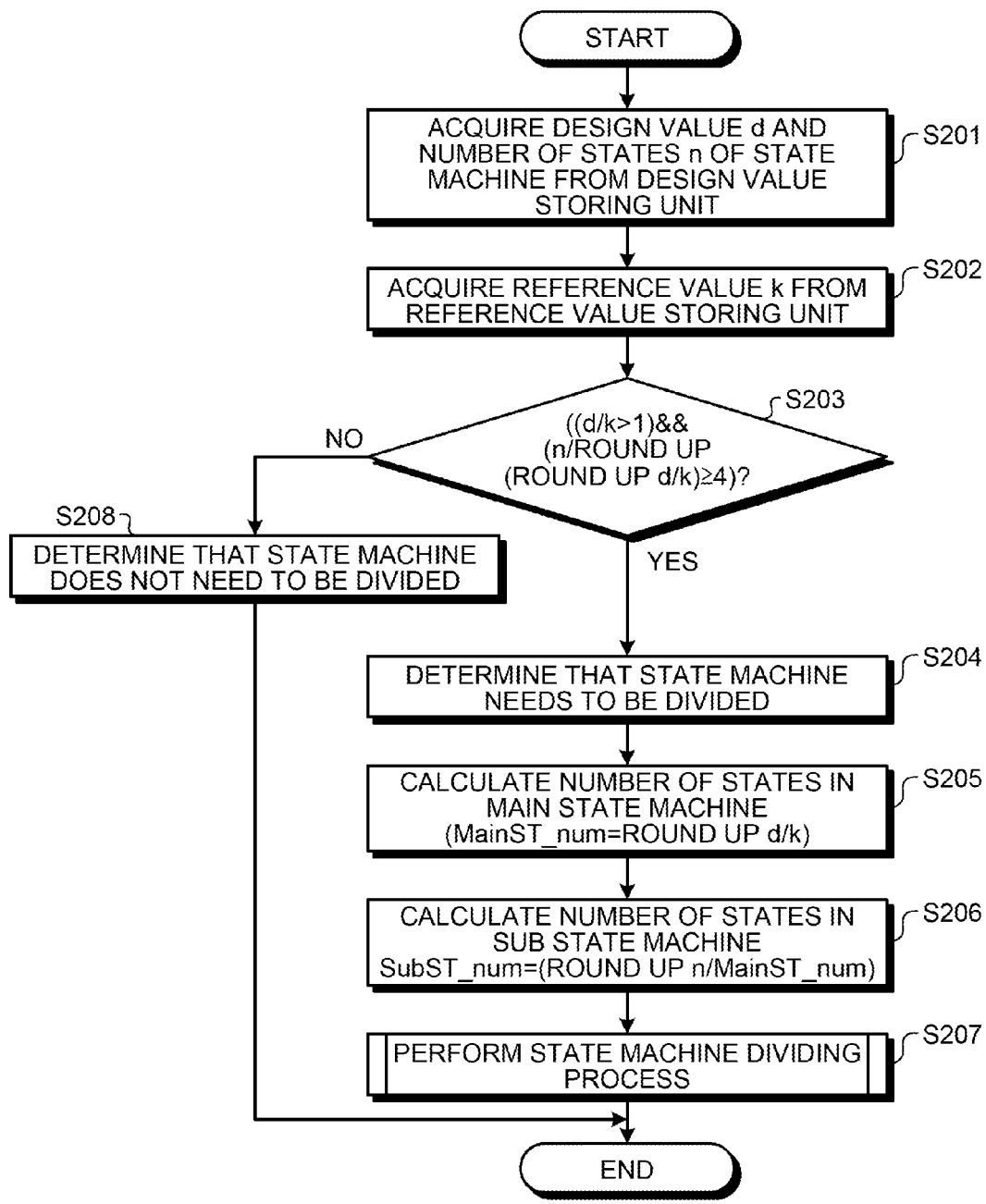
FIG. 18 is a flowchart illustrating the flow of a process performed by the behavioral synthesis device according to the second embodiment.

In the following, an example of the flow of a process performed by the behavioral synthesis device 1a will be described with reference to FIG. 18. FIG. 18 is a flowchart illustrating the flow of a process performed by the behavioral synthesis device according to the second embodiment. First, the behavioral synthesis device 1a acquires, from the set value storing unit 11, the design value d and the number of states n in the state machine (Step S201) and acquires, from the reference value storing unit 10a, the reference value k (Step S202). Then, the behavioral synthesis device 1a determines whether the value obtained by dividing the design value d by the reference value k is equal to or greater than 1 and the value by rounding up the value that is obtained by dividing n by the value obtained by dividing d by k is equal to or greater than a predetermined value (4) (Step S203).

Then, if the condition at Step S203 is satisfied (Yes at Step S203), i.e., if the design value exceeds the reference value and the number of states in the sub state machine is equal to or greater than the predetermined threshold, the behavioral synthesis device 1a performs the following process. Namely, the behavioral synthesis device 1a determines that the state machine needs to be divided (Step S204) and calculates the number of states in the main state machine (Step S205). Specifically, the behavioral synthesis device 1a sets, to the number of states MainST_num in the main state machine, the value obtained by rounding up d/k.

Furthermore, the behavioral synthesis device 1a calculates the number of states in the sub state machine (Step S206). Specifically, the behavioral synthesis device 1a sets, to SubST_num, the value obtained by rounding up the value obtained by dividing n by the number of states MainST_num in the main state machine. Then, the behavioral synthesis device 1a performs the state machine dividing process of dividing the state machine (Step S207) and ends the process. In contrast, if the condition at Step S203 is not satisfied (No at Step S203), i.e., if the set value does not exceed the reference value or if the number of states in the sub state machine is smaller than the predetermined number, the behavioral synthesis device 1a performs the following process. Namely, the behavioral synthesis device 1a determines that the state machine does not need to be divided (Step S208) and ends the process.

Advantage of the Second Embodiment

As described above, the behavioral synthesis device 1a divides the state machine only when the value obtained by dividing the number of states held in the state machine by the value that is obtained by dividing the design value by the reference value is equal to or greater than the predetermined threshold. Namely, if the number of states in the sub state machine is equal to or greater than the predetermined value, the behavioral synthesis device 1a determines to divide the state machine. Then, the behavioral synthesis device 1a creates a main state machine that has the same number of states as a value obtained by rounding up the value that is obtained by dividing the design value by the reference value. Furthermore, the behavioral synthesis device 1a creates a sub state machine that has the same number of states as a value obtained by rounding up the value that is obtained by dividing the number of states held in the state machine by the number of states held in the main state machine.

Thus, because the behavioral synthesis device 1a does not need to divide an unneeded state machine, the time taken to design the circuit can further be reduced. Furthermore, the behavioral synthesis device 1a can reduce the trouble, such as the divided state machine becoming a problem in terms of timing due to the dividing of the unneeded state machine.

Furthermore, the behavioral synthesis device 1a sets, to the design value and the reference value, the value of the latency that is a time period for which a circuit completes a process. Here, the number of states held in the state machine can be estimated based on the value of the latency. Consequently, by comparing the value of the latency as the estimated value and the reference value, the behavioral synthesis device 1a can determine whether the state machine needs to be divided before the RTL of the state machine is created, whereby the time taken to design the circuit can further be reduced.

Furthermore, the behavioral synthesis device 1a sets, to the design value and the reference value, the number of operations that is the number of computations performed until the circuit completes the process. Here, the number of states held in a state machine can be estimated by using the number of operations. Accordingly, because the behavioral synthesis device 1a can determines whether the state machine needs to be divided before an RTL of the state machine is created, the time taken to design the circuit can be further reduced.

Here, if the number of fanouts is great, the length of wiring is increased or, because a buffer is installed due to an increase in the number of FFs for the reference target, the state machine may possibly become a problem in terms of timing. However, the behavioral synthesis device 1a sets, to the design value and the reference value, the number of fanouts that is a reference count indicating the number of times the state held in the state machine refers to. Consequently, if the number of fanouts in the state machine exceeds the reference value, because the behavioral synthesis device 1a determines that the state machine becomes a problem in terms of timing and thus divides the state machine, the number of fanouts in each of the divided state machines is reduced. Consequently, the behavioral synthesis device 1a can prevent the state machine from becoming a problem in terms of operation timing.

[c] Third Embodiment

In the first and the second embodiments described above, the behavioral synthesis devices 1 and 1a that divide a state machine created from a behavioral description into the main state machine and the sub state machine having the number of states obtained based on the values indicated by the reference value and the design value. However, the embodiment is not limited thereto. In the following, as a third embodiment, another example of the process performed by a behavioral synthesis device will be described.

For example, a behavioral synthesis device 1b according to the third embodiment stores therein the number of fanouts as the reference value and, if the behavioral synthesis device 1b acquires the number of fanouts from an RTL as a set value, the behavioral synthesis device 1b compares the reference value with the set value. Then, if the set value exceeds the reference value, the behavioral synthesis device 1b may also sequentially divides a state machine until the value of the set value becomes smaller than the reference value.

Figure 19:
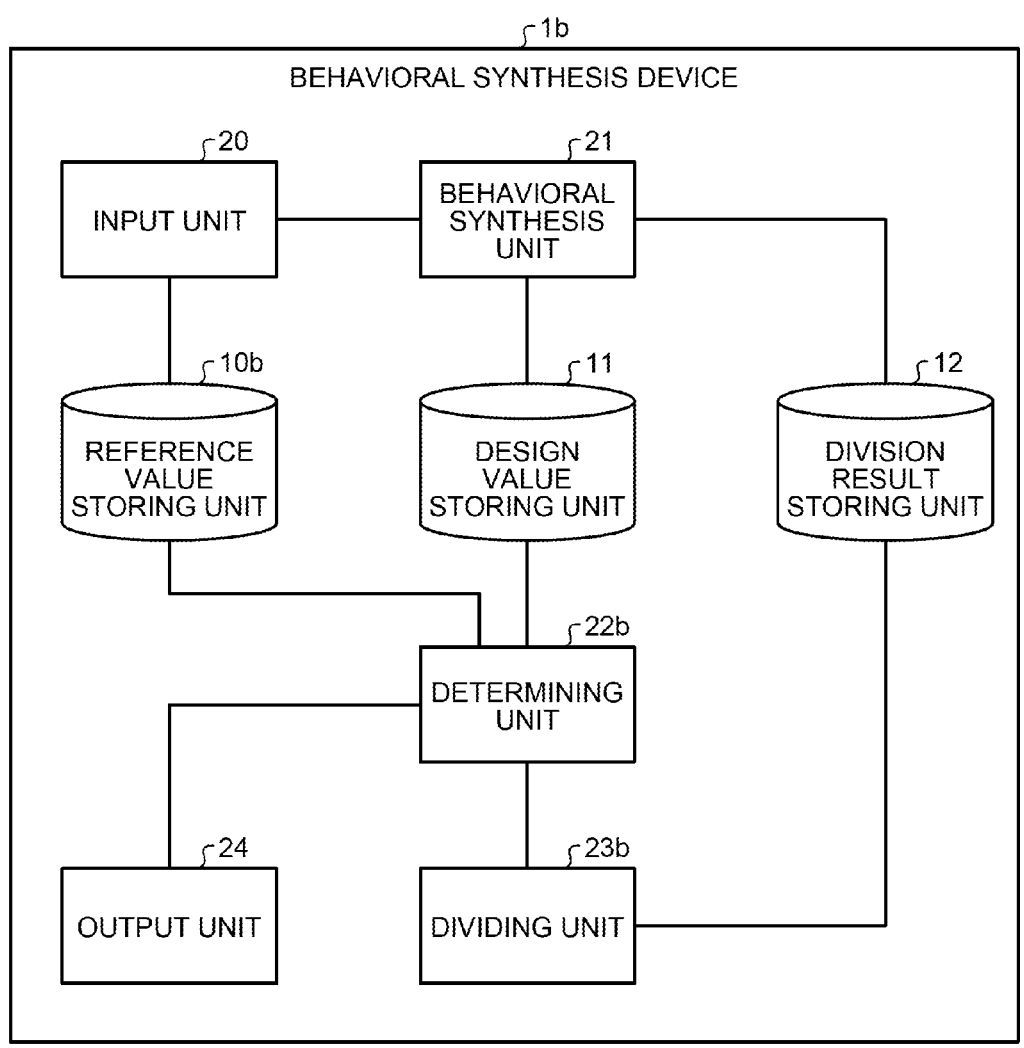
FIG. 19 is a schematic diagram illustrating an example of a functional configuration of a behavioral synthesis device according to a third embodiment.

FIG. 19 is a schematic diagram illustrating an example of a functional configuration of a behavioral synthesis device according to a third embodiment. In the example illustrated in FIG. 19, the behavioral synthesis device 1b includes a reference value storing unit 10b, the set value storing unit 11, the division result storing unit 12, the input unit 20, the behavioral synthesis unit 21, a determining unit 22b, a dividing unit 23b, and the output unit 24. Furthermore, in a description below, components having the same function as those described in the first and the second embodiments are assigned the same reference numerals; therefore, descriptions thereof will be omitted.

The reference value storing unit 10b stores therein the number of fanouts as the reference value that is previously set. The determining unit 22b analyzes an RTL stored in the set value storing unit 11 and counts the number of reference targets of the state machine, whereby the determining unit 22b specifies the number of fanouts. Then, if the specified number of fanouts, i.e., if the set value exceeds the reference value stored in the reference value storing unit 10b, the determining unit 22b outputs the information stored in the set value storing unit 11 to the dividing unit 23b. In contrast, if the set value does not exceeds the reference value, the determining unit 22b outputs the information stored in the set value storing unit 11 to the output unit 24.

If the set value exceeds the reference value, the dividing unit 23b divides the state machine until the set value becomes smaller than the reference value. More specifically, the dividing unit 23b divides the state machine into two sub state machines that have substantially the same number of states and a single main state machine that indicates the transition between the sub state machines. Then, the dividing unit 23b counts the number of fanouts in the sub state machine and divides, if the number of counted fanouts exceeds the reference value, the dividing unit 23b divides each of the created sub state machines into two sub state machines. Furthermore, the dividing unit 23b counts the number of fanouts in each of the divided sub state machines and further divides, if the number of fanouts exceeds the reference value, each of the sub state machines.

Figure 20:
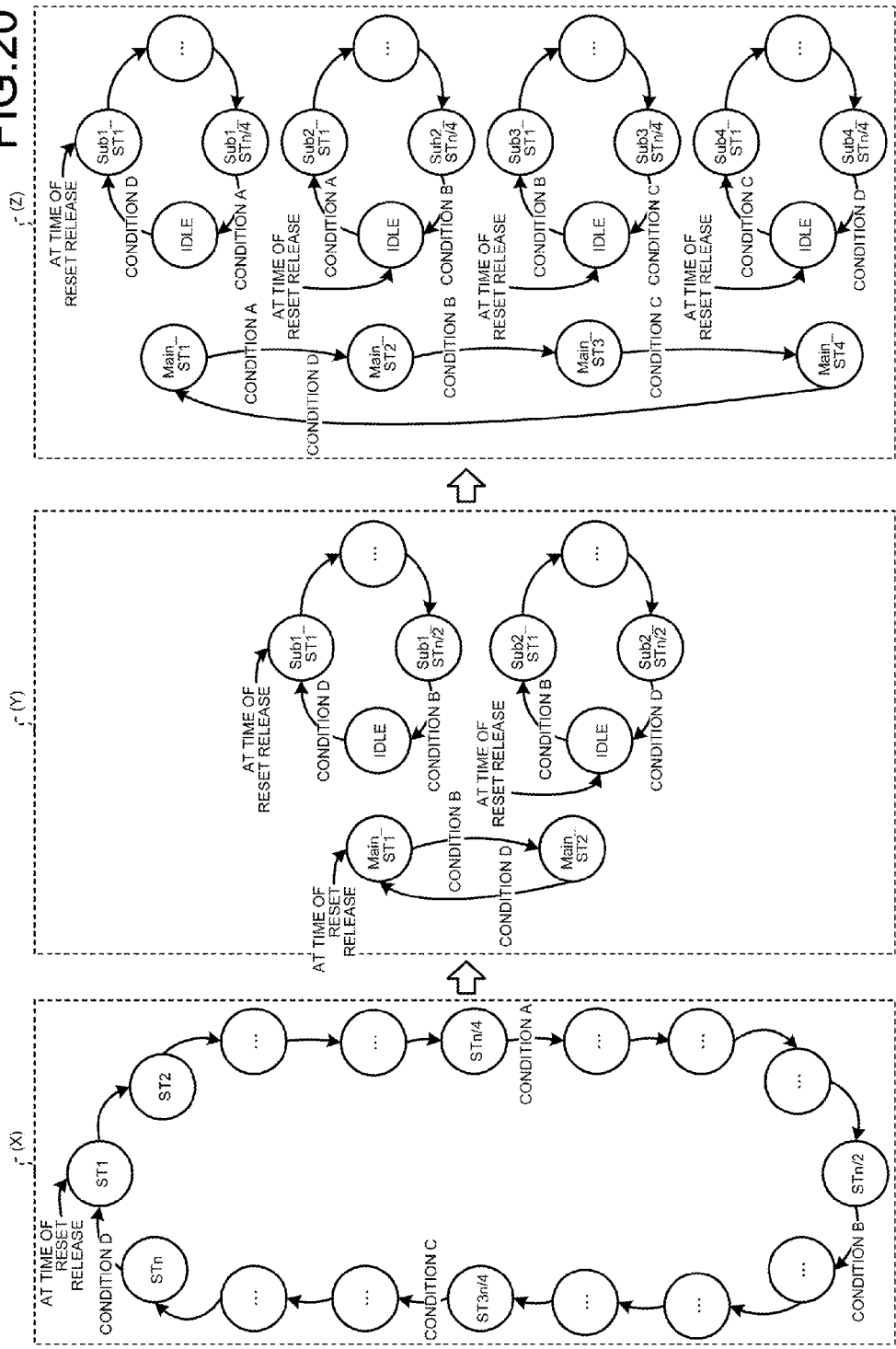
FIG. 20 is a schematic diagram illustrating an example of a process in which the behavioral synthesis device according to the third embodiment divides a state machine.

In the following, an example of a process in which the dividing unit 23b divides the state machine into a main state machine and sub state machines will be described with reference to FIG. 20. FIG. 20 is a schematic diagram illustrating an example of a process in which the behavioral synthesis device according to the third embodiment divides a state machine. In the example illustrated in FIG. 20, similarly to FIG. 7, the state machine is represented by using ST1 to STn that are n states held in the main state machine and by using the arrows that indicate the transition of each of the states.

For example, the dividing unit 23b acquires an RTL if the state machine that holds the states ST1 to STn indicated by (X) illustrated in FIG. 20. In such a case, the dividing unit 23b divides, as a dividing process performed first time, the state machine into a main state machine that holds two states and sub state machines that are obtained by dividing the state machine into two.

For example, the dividing unit 23b divides the state machine into a state machine that holds the states ST1 to STn/2 and a state machine that holds the states STn/2+1 to STn. Furthermore, the dividing unit 23b specifies the transition condition B that is the transition from the state STn/2 to the state STn/2+1 and specifies the transition condition D that is the transition from the state STn to the state ST1. Then, the dividing unit 23b creates a main state machine that holds two states and sets the transition condition B and the transition condition D as the transition conditions among the states held in the main state machine.

Furthermore, the dividing unit 23b adds idle states to the states starting from the states ST1 to STn/2. Furthermore, the dividing unit 23b sets the transition condition and the transition destination state of the states ST1 and STn/2 such that the transition from the idle state to the state ST1 is performed under the transition condition D and the transition from the state STn/2 to the idle state is performed under the transition condition B. Then, the dividing unit 23b changes the name of the states ST1 to STn/2 to Sub1_ST1 to Sub1_STn/2.

Furthermore, the dividing unit 23b adds the idle state to the states, i.e., the states STn/2 to STn. Furthermore, the dividing unit 23b sets the transition condition and the transition destination state of the states STn/2 and STn such that the transition from the idle state to the state STn/2 is performed under the transition condition B and the transition from the state STn to the idle state is performed under the transition condition D. Then, the dividing unit 23b changes the name of the states STn/2+1 to STn to Sub2_ST1 to Sub2_STn/2.

Consequently, as indicated by (X) illustrated in FIG. 20, the dividing unit 23b creates a main state machine in which transition of the state from Main_ST1 to Main_ST2 is performed under the transition condition B and transition of the state from Main_ST2 to Main_ST1 is performed under the transition condition D. Furthermore, the dividing unit 23b creates a sub state machine in which transition of the state from the idle state to the state Sub1_ST1 is performed under the transition condition D and transition of the state from the Sub1_STn/2 to the idle state is performed under the transition condition B. Furthermore, the dividing unit 23b creates a sub state machine in which transition of the state from the idle state to the state Sub2_ST1 is performed under the transition condition B and transition of the state from Sub2_STn/2 to the idle state is performed under the transition condition D.

Namely, the dividing unit 23b creates a sub state machine in which transition of the state starts under the transition condition B and the transition of the state is stopped under the transition condition D and a sub state machine in which transition of the state starts under the transition condition D and transition of the state is stopped under the transition condition B. Furthermore, the dividing unit 23b creates a main state machine in which the state is changed under the transition condition B and the transition condition D.

Furthermore, the dividing unit 23b counts the number of fanouts in each of the created sub state machines and determines whether the number of counted fanouts, i.e., the design value, exceeds the reference value. If the design value exceeds the reference value, the dividing unit 23b further divides each of the created sub state machines.

For example, in the example illustrated in FIG. 20, the transition condition from the state STn/4 to the state STn/4+1 is the transition condition A and the transition condition from the state ST3n/4 to the state ST3n/4+1 is the transition condition C. In such a case, the dividing unit 23b newly creates a main state machine in which the number of states of the main state machine is double and transition of the states is sequentially performed under the transition conditions A to D.

Furthermore, the dividing unit 23b divides the state machine into four groups. For example, the dividing unit 23b divides into the states from the state ST1 to STn/4, the states from the state STn/4+1 to STn/2, the states from the state STn/4+1 to ST3n/4, and the states from the states ST3n/4+1 to STn. Then, the dividing unit 23b creates four sub state machines by adding each of the divided groups to an idle state and sets the transition destination condition and the transition destination state such that each of the individual sub state machines starts transition of the states under the specified transition conditions A to D.

Consequently, as indicated by (Z) illustrated in FIG. 20, the dividing unit 23b creates a main state machine in which transition of the state from Main_ST1 to Main_ST2 is performed under the transition condition A and transition of the state from Main_ST2 to Main_ST3 is performed under the transition condition B. Furthermore, the dividing unit 23b creates the main state machine in which transition of the state from Main_ST3 to Main_ST4 is performed under the transition condition C and transition of the state from Main_ST4 to Main_ST1 is performed under the transition condition D.

Furthermore, the dividing unit 23b creates a sub state machine in which transition of the state from the idle state to the state Sub1_ST1 is performed under the transition condition D and transition of the state from Sub1_STn/4 to the idle state is performed under the transition condition A. Furthermore, the dividing unit 23b creates a sub state machine in which transition of the state from the idle state to the state Sub2_ST1 is performed under the transition condition A and transition of the state from Sub2_STn/4 to the idle state is performed under the transition condition B. Furthermore, the dividing unit 23b creates a sub state machine in which transition of the state from the idle state to the state Sub3_ST1 is performed under the transition condition B and transition of the state from Sub3_STn/4 to the idle state is performed under the transition condition C. Furthermore, the dividing unit 23b creates a sub state machine in which transition of the state from the idle state to the state Sub4_ST1 is performed under the transition condition C and transition of the state from Sub4_STn/4 to the idle state is performed under the transition condition D.

Furthermore, the dividing unit 23b repeatedly performs the process described above until the number of fanouts in the sub state machine is equal to or less than the reference value and sequentially divides the main state machine. Consequently, because the behavioral synthesis device 1b can create a state machine that satisfies the reference value and thus prevent the state machine from becoming a problem in terms of timing.

Figure 21:
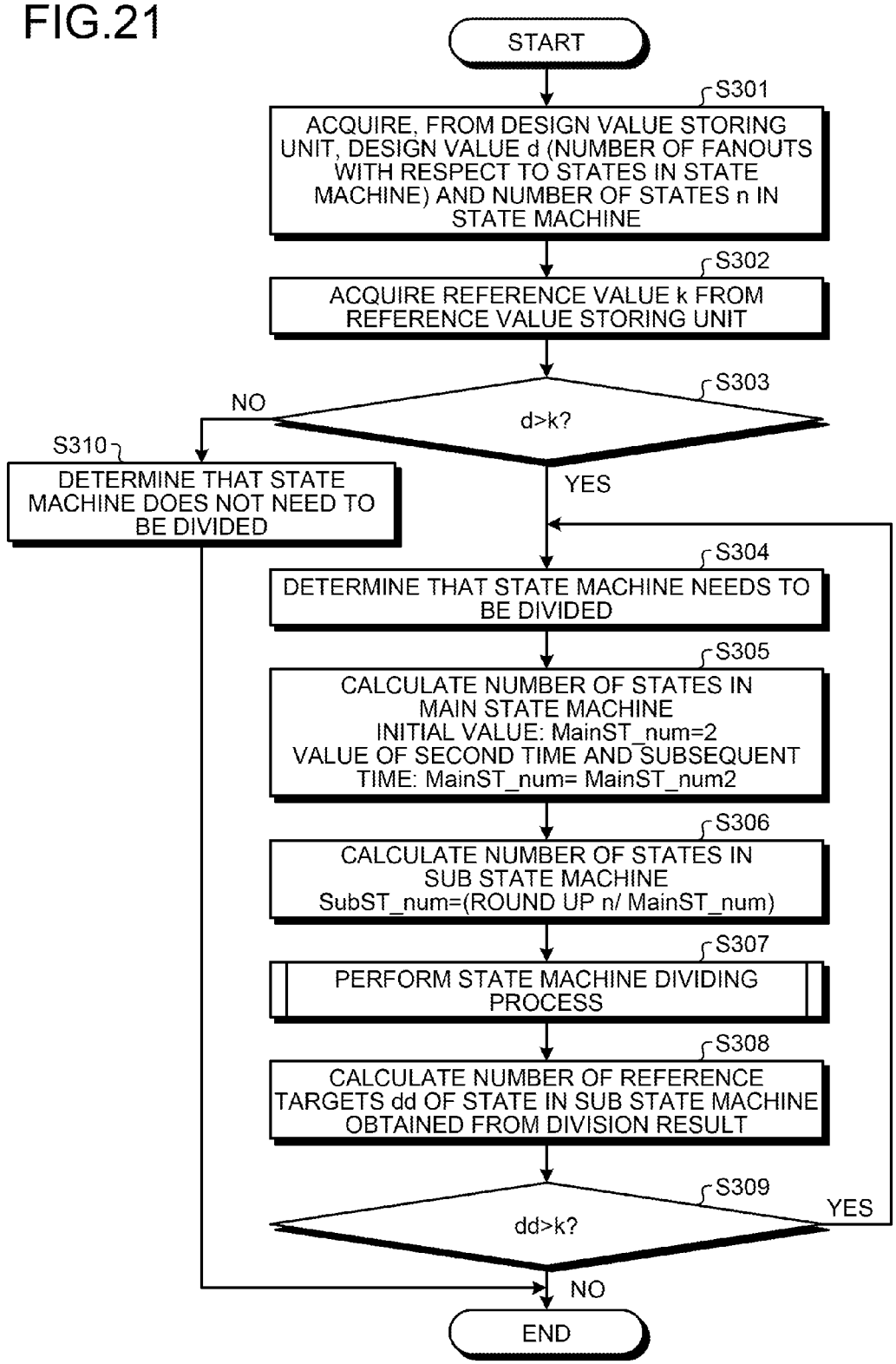
FIG. 21 is a flowchart illustrating the flow of a process performed by the behavioral synthesis device according to the third embodiment.

In the following, an example of the flow of the process performed by the behavioral synthesis device 1b will be described with reference to FIG. 21. FIG. 21 is a flowchart illustrating the flow of a process performed by the behavioral synthesis device according to the third embodiment. First, the behavioral synthesis device 1b acquires, from the set value storing unit 11, the design value d that is the number of fanouts with respect to the states of the state machine and the number of states n in the state machine (Step S301) and acquires, from the reference value storing unit 10b, the reference value k (Step S302). Then, the behavioral synthesis device 1b determines whether the design value d is greater than the reference value k (Step S303).

If the design value d is greater than the reference value k (Yes at Step S303), the behavioral synthesis device 1b determines that the state machine needs to be divided (Step S304) and calculates the number of states in the main state machine (Step S305). Specifically, the behavioral synthesis device 1b sets MainST_num=2 as the initial value of the number of states in the main state machine. Furthermore, if the process at Step S305 is performed the second and the subsequent time, the behavioral synthesis device 1b doubles the number of states in the main state machine.

Then, the behavioral synthesis device 1b calculates the number of states in the sub state machine (Step S306). Specifically, the behavioral synthesis device 1b sets, to the number of states SubST_num in the sub state machine, a value obtained by rounding up a value obtained by dividing the number of states n held in the state machine by the number of states MainST_num held in the main state machine. Then, the behavioral synthesis device 1b performs the state machine dividing process illustrated in FIG. 16 (Step S307).

Here, the behavioral synthesis device 1b calculates the number of reference targets dd of the state that is held in the sub state machine obtained from the division result (Step S308) and determines whether the calculated dd is greater than k (Step S309). If the calculated dd is equal to or less than k (No at Step S309), the behavioral synthesis device 1b ends the process. In contrast, if the calculated dd is greater than k (Yes at Step S309), the behavioral synthesis device 1b again performs the process at Step S304. Furthermore, if the value of the design value d is equal to or less than the value of the reference value k (No at Step S303), the behavioral synthesis device 1b determines that the state machine does not need to be divided (Step S310) and ends the process.

Advantage of the Third Embodiment

As described above, if the design value exceeds the reference value, the behavioral synthesis device 1b sequentially divides the state machine until the design value is equal to or less than the reference value. Consequently, the behavioral synthesis device 1b can prevent a state machine created from a behavioral description from becoming a problem in terms of timing and reduce the time taken to design a circuit.

[d] Fourth Embodiment

In the first to the third embodiments described above, a description has been given of the behavioral synthesis devices 1 to 1b that divide, when the design value exceeds the reference value, the state machine into a main state machine and sub state machines. However, the embodiment is not limited thereto. In the following, as a fourth embodiment, another example of a process performed by a behavioral synthesis device will be described.

For example, a behavioral synthesis device 1c according to the fourth embodiment compares the design value based on an RTL with the reference value that is previously set. If the design value exceeds the reference value, the behavioral synthesis device 1c adds a flip-flop that becomes a reference target of the state held in the state machine. Consequently, because the behavioral synthesis device 1c can distribute the flip-flop that becomes the reference target when the data path unit refers to the state, the number of buffers that drive the reference target can be reduced and, consequently, it is possible to prevent the state machine from becoming a problem in terms of operation timing.

Figure 22:
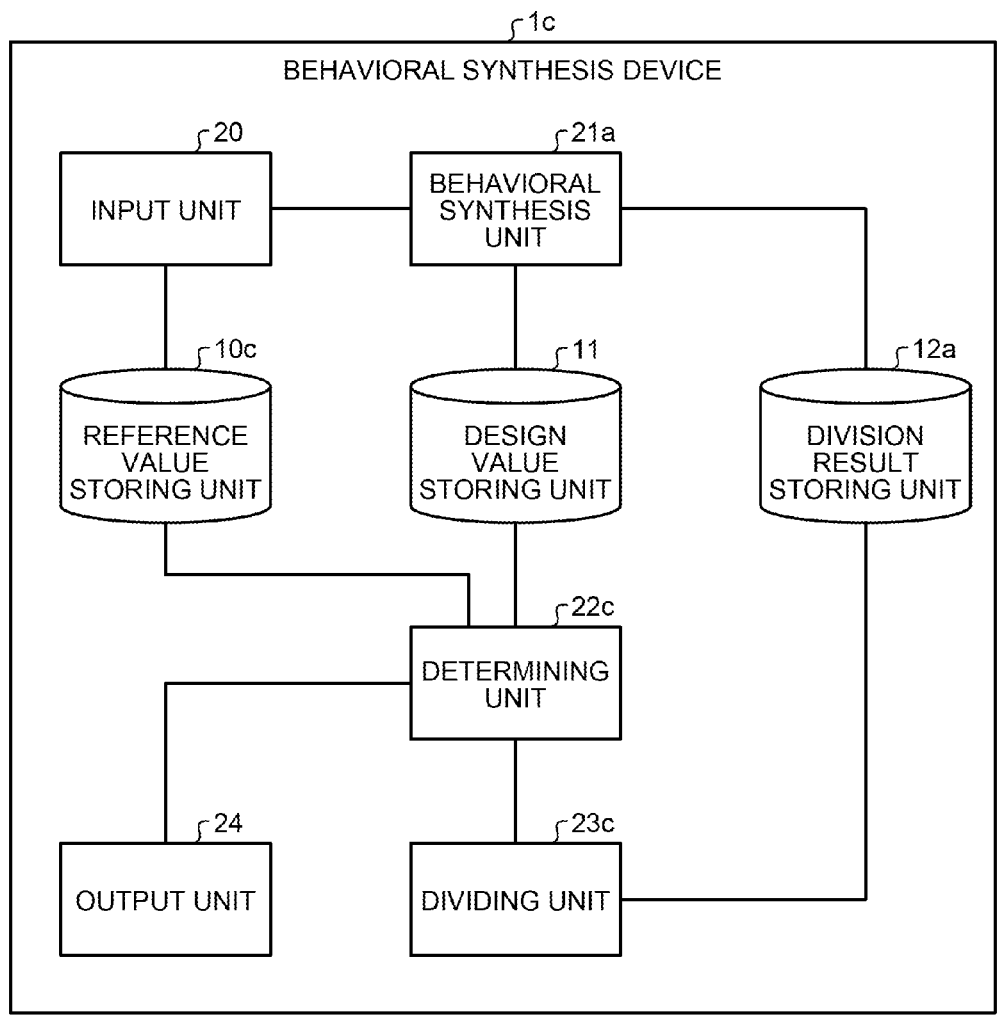
FIG. 22 is a schematic diagram illustrating an example of a functional configuration of a behavioral synthesis device according to a fourth embodiment.

FIG. 22 is a schematic diagram illustrating an example of a functional configuration of a behavioral synthesis device according to a fourth embodiment. In the example illustrated in FIG. 22, the behavioral synthesis device 1c includes a reference value storing unit 10c, the set value storing unit 11, a division result storing unit 12a, the input unit 20, a behavioral synthesis unit 21a, a determining unit 22c, a dividing unit 23c, and the output unit 24. Furthermore, in a description below, components having the same function as those described in the first to the third embodiments are assigned the same reference numerals; therefore, descriptions thereof will be omitted.

Similarly to the reference value storing units 10 to 10b, the reference value storing unit 10c stores therein the reference value that is previously set. For example, the reference value storing unit 10c stores therein, as the reference value, the latency or the number of operations that is the number of computations performed until the circuit completes the process. Furthermore, in another example, the reference value storing unit 10c stores therein, as the reference value, the number of states held in the state machine or the number of fanouts that is the number of times the state machine refers to each of the states.

Figure 23:
FIG. 23 is a schematic diagram illustrating an example of information stored in the division result storing unit according to the fourth embodiment.

The division result storing unit 12a stores therein information about the flip-flop that is added by the dividing unit 23c. For example, FIG. 23 is a schematic diagram illustrating an example of information stored in the division result storing unit according to the fourth embodiment. For example, as illustrated in FIG. 23, the division result storing unit 12a stores therein "cpff_id[n][c]" as the index of the copy FF that is the added flip-flop.

A description will be continued here by referring back to FIG. 22. Similarly to the behavioral synthesis unit 21, the behavioral synthesis unit 21a performs behavioral synthesis on an RTL from a behavioral description. Furthermore, as will be described later, if the index of the copy FF is registered in the division result storing unit 12a by the dividing unit 23c, the behavioral synthesis unit 21a creates, by using the index of the copy FF, an RTL that is obtained by dividing the reference target of the state.

For example, the index of a first copy FF and the index of a second copy FF are registered in the division result storing unit 12a. In such a case, the behavioral synthesis unit 21a changes the reference target index of half of the states from among the states held in the state machine to the index of the first copy FF and changes the reference target index of the remaining half of the states to the index of the second copy FF.

Figure 24:
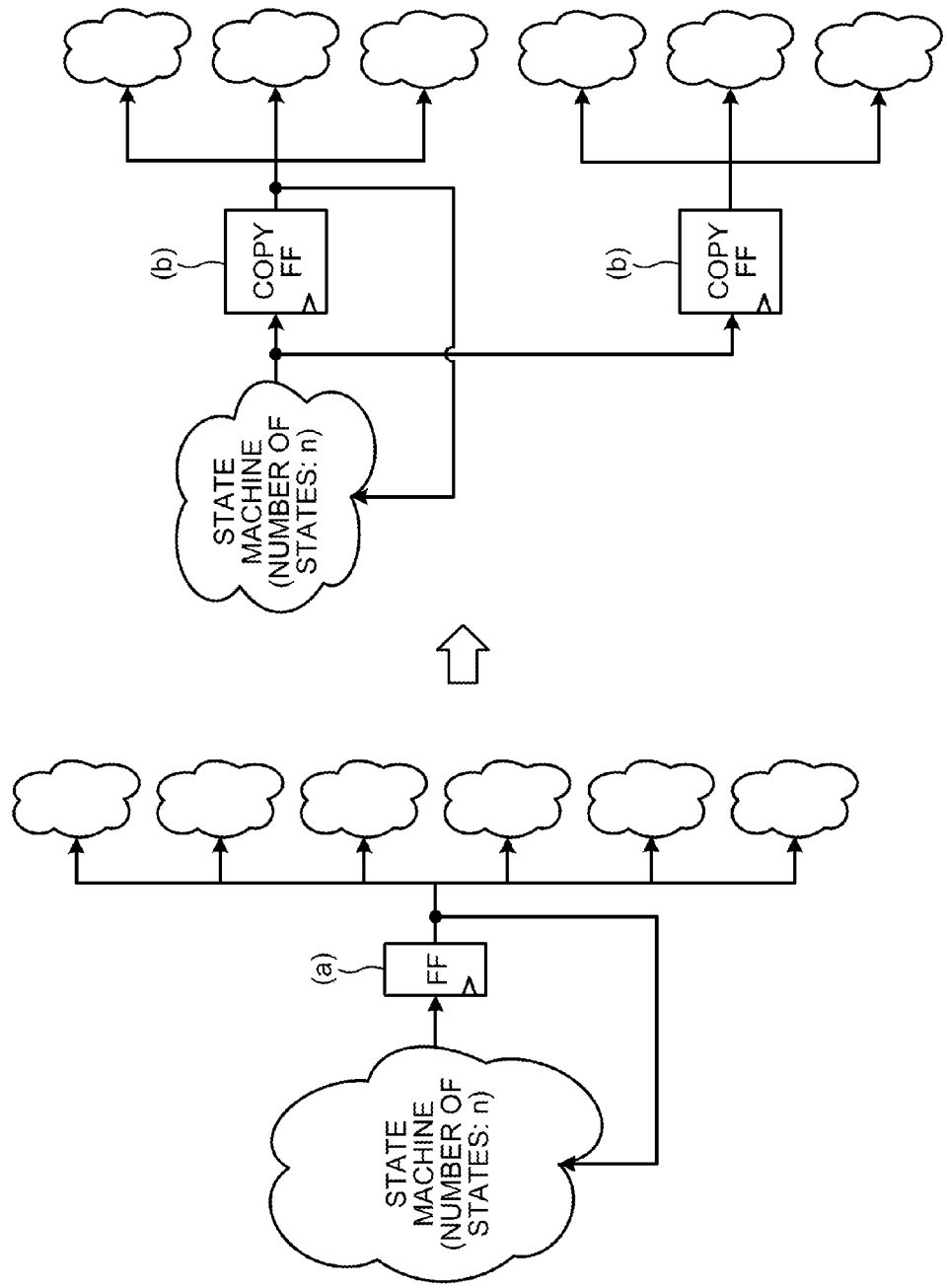
FIG. 24 is a schematic diagram illustrating an example of a process in which the behavioral synthesis device according to the fourth embodiment distributes reference targets.

Here, FIG. 24 is a schematic diagram illustrating an example of a process in which the behavioral synthesis device according to the fourth embodiment distributes reference targets. For example, in the example indicated by (a) illustrated in FIG. 24, the FF that is the reference target of the states in the state machine is connected to the six circuits that refers to the state machine. In such a case, as indicated by (b) illustrated in FIG. 24, the behavioral synthesis device 1c adds the FFs that become the reference targets and distributes the reference targets of the states. Consequently, because the behavioral synthesis device 1c can reduce the number of circuits connected to each of the FFs to three, the buffer that compensates signals is not needed and thus it is possible to prevent the state machine from becoming a problem in terms of operation timing.

A description will be given here by referring back to FIG. 22. Similarly to the determining units 22 to 22b, the determining unit 22c determines whether the set value exceeds the reference value. For example, the determining unit 22c analyzes the RTL stored in the set value storing unit 11 and specifies the set value with the type associated with the reference value. If the specified set value exceeds the reference value, the determining unit 22c outputs the information stored in the set value storing unit 11 to the dividing unit 23c and outputs, if the set value does not exceeds the reference value, the information stored in the set value storing unit 11 to the output unit 24.

If the set value exceeds the reference value, the dividing unit 23c adds a flip-flop that becomes the reference target of the state in the state machine. Specifically, the dividing unit 23c calculates the value obtained by rounding up the value obtained by dividing the set value by the reference value. Then, the dividing unit 23c creates the index of the copy FFs, the number of which is the same as that of the calculated value, and registers the created index of the copy FFs in the division result storing unit 12a. Consequently, the dividing unit 23c can divide the reference target of the states in the state machine.

Figure 25:
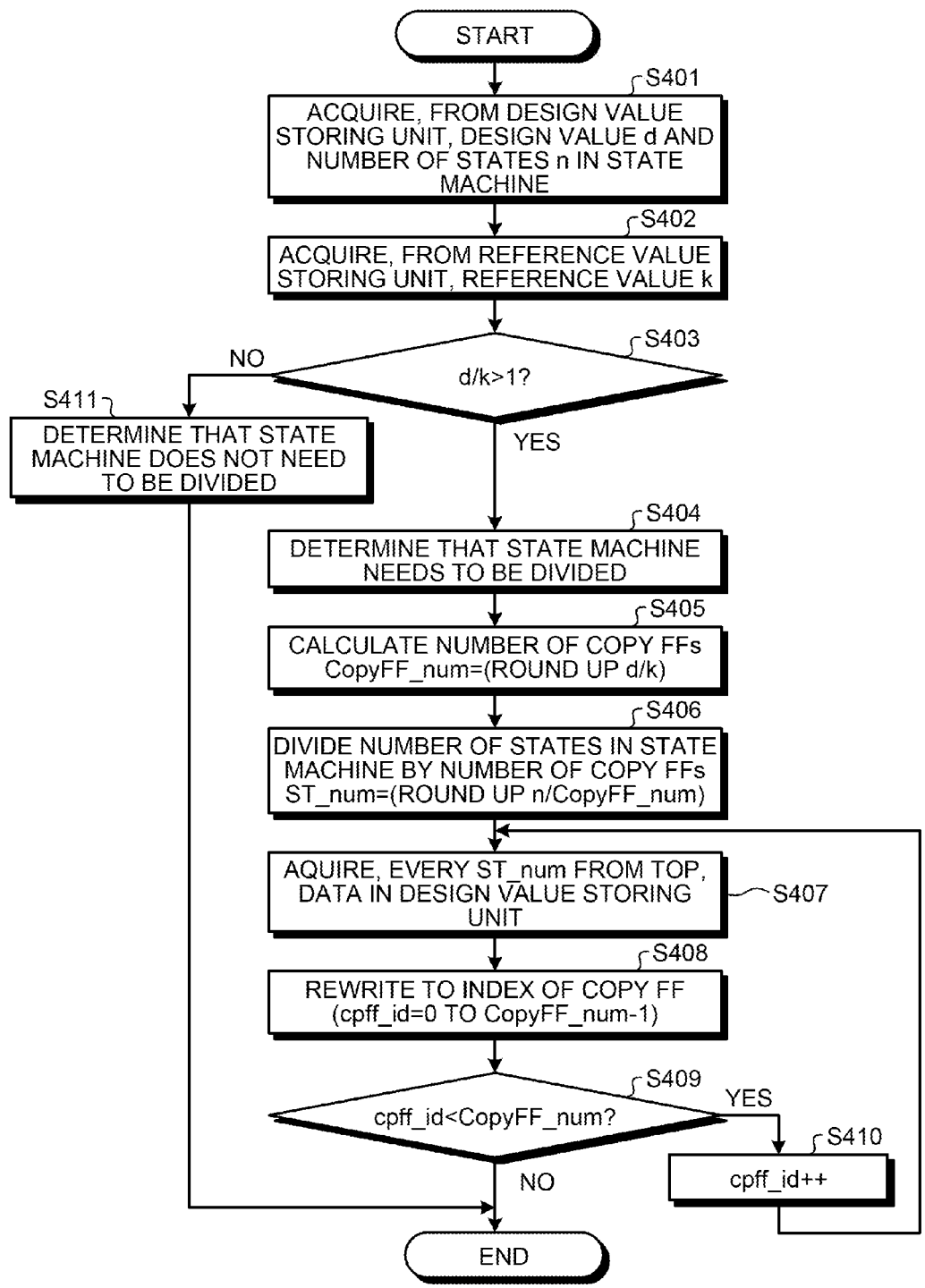
FIG. 25 is a flowchart illustrating the flow of a process performed by the behavioral synthesis device according to the fourth embodiment.

In the following, an example of the flow of a process performed by the behavioral synthesis device 1c will be described with reference to FIG. 25. FIG. 25 is a flowchart illustrating the flow of a process performed by the behavioral synthesis device according to the fourth embodiment. Furthermore, in the example illustrated in FIG. 25, it is assumed that the initial value of the variable cpff_id that indicates the copy FF is set to "0".

First, the behavioral synthesis device 1c acquires, from the set value storing unit 11, the design value d and the number of states n in the state machine (Step S401) and acquires, from the reference value storing unit 10c, the reference value k (Step S402). Then, the behavioral synthesis device 1c determines whether the value obtained by dividing the design value d by the reference value k is equal to or greater than 1 (Step S403).

If the value obtained by dividing the design value d by the reference value k is equal to or greater than 1 (Yes at Step S403), the behavioral synthesis device 1c determines that the state machine needs to be divided (Step S404) and calculates the number of copy FFs (Step S405). Specifically, the behavioral synthesis device 1c sets, as the number of copy FFs, i.e., as CopyFF_num that is the number of copy FFs, a value obtained by rounding up a value that is obtained by dividing the design value d by the reference value k.

Subsequently, the behavioral synthesis device 1c calculates a value by dividing the number of states n in the state machine by the number of copy FFs (Step S406). Specifically, the behavioral synthesis device 1c sets, to ST_num, the value obtained by rounding up the value obtained by dividing n by CopyFF_num. Furthermore, the behavioral synthesis device 1c acquires, every ST_num from the top, the state in the state machine registered in the set value storing unit 11 (Step S407). Then, the behavioral synthesis device 1c rewrites the reference target index of the acquired state to the index of the copy FF (Step S408). For example, the behavioral synthesis device 1c rewrites the reference target index of the acquired state to "cpff_id=0".

Furthermore, the behavioral synthesis device 1c determines whether the value of cpff_id is smaller than the value of CopyFF_num (Step S409). If the value of cpff_id is equal to or greater than the value of CopyFF_num (No at Step S409), the behavioral synthesis device 1c ends the process. In contrast, if the value of cpff_id is smaller than the value of CopyFF_num (Yes at Step S409), the behavioral synthesis device 1c increments the value of cpff_id by 1 (Step S410) and again performs the process at Step S407. Furthermore, if the value obtained by dividing the set value d by the reference value k is equal to or less than 1 (No at Step S403), the behavioral synthesis device 1c determines that the state machine does not need to be divided (Step S411) and ends the process.

Advantage of the Fourth Embodiment

As described above, the behavioral synthesis device 1c compares the design value with the reference value and outputs, if the design value exceeds the reference value, the circuit information in which the flip-flop that becomes the reference target of the state in the state machine is added. Consequently, the behavioral synthesis device 1c can reduce the time taken to design a circuit while preventing the state machine from becoming a problem in terms of operation timing. Furthermore, even if a state machine is created, the number of FFs that is used as the reference target by the data path unit can be set. Consequently, if the behavioral synthesis device 1c uses the reference value and the set value, such as a value of the latency, the number of operations, or the like, that can be compared before a state machine is created, the behavioral synthesis device 1c can further reduce the time taken to design the state machine circuit.

Furthermore, the behavioral synthesis device 1c outputs the circuit information in which a flip-flop, the number of which is associated with the value obtained by dividing the design value by the reference value, is added. Consequently, because the behavioral synthesis device 1c can divide the reference target of the state in the state machine into the number of reference targets associated with the ratio of the reference value to the design value, the behavioral synthesis device 1c can prevent the state machine from becoming a problem in terms of timing.

[e] Fifth Embodiment

In the above explanation, a description has been given of the embodiments according to the present invention; however, the present invention may also be implemented with various kinds of embodiments other than the embodiments described above. Therefore, another embodiment will be described below as a fifth embodiment.

Process of Dividing a State Machine

In the description above, the behavioral synthesis devices 1 to 1b divide the state machine into a main state machine and sub state machines. Here, in addition to the processes described above, an arbitrary process may also be used for the process of dividing the state machine performed by the behavioral synthesis devices 1 to 1b. Namely, the behavioral synthesis devices 1 to 1b determine whether a state machine becomes a problem in terms of operation timing from the comparison result of the set value and the reference value without performing the timing analysis of an RTL regardless of the method of dividing the state machine. Then, if the state machine becomes a problem in terms of operation timing from the comparison result of the set value and the reference value, because the behavioral synthesis devices 1 to 1b divide the state machine, it is possible to reduce the time taken to design a circuit.

Reference Value and Set Value

In the first to the fourth embodiments described above, a description has been given of an example in which a value of the latency, the number of operations, the number of states in a state machine, the number of fanouts associated with a state are set to the reference value and the set value. The reference value and the set value are only examples and arbitrary information may also be set to the reference value and the set value as long as the behavioral synthesis devices 1 to 1c can determine, before timing analysis of an RTL is performed, whether a state machine becomes a problem in terms of operation timing. Namely, the behavioral synthesis devices 1 to 1c according to the first to the fourth embodiment may also set, to the reference value and the set value, a value of the latency, the number of operations, the number of states in a state machine, and the number of fanouts associated with the state.

Furthermore, the behavioral synthesis devices 1 to 1c may also determine whether a state machine becomes a problem in terms of operation timing by using the reference value and the set value that are a combination of different types of information. Furthermore, in addition to setting an arbitrary value by a user from the outside, the reference value and the set value may also be a value estimated from the operation frequency of the design of a circuit or a value estimated from the type of a technology library.

Reference Value

An arbitrary value can be set for the reference value that is set in the behavioral synthesis devices 1 to 1c described above. For example, a user can change the reference value any time in accordance with the design of a circuit, the purpose, the content of wiring, or the like. Furthermore, the value of the reference value may also be a value that is automatically set in accordance with the function requested by a circuit, the design, the purpose, the content of wiring, or the like or may also be a value that is arbitrary set by a user.

Functional Configuration

Of the processes described in the embodiments, all or a part of the processes that are mentioned as being automatically performed can be manually performed, or all or a part of the processes that are mentioned as being manually performed can be automatically performed using known methods. Furthermore, the flow of the processes, the specific names, and the information containing various kinds of data or parameters indicated in the above specification and drawings can be arbitrarily changed unless otherwise stated.

The components of each device illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of the processing functions performed by each device can be implemented by a CPU and programs analyzed and executed by the CPU or can be implemented as hardware by wired logic.

Hardware Configuration

Figure 26:
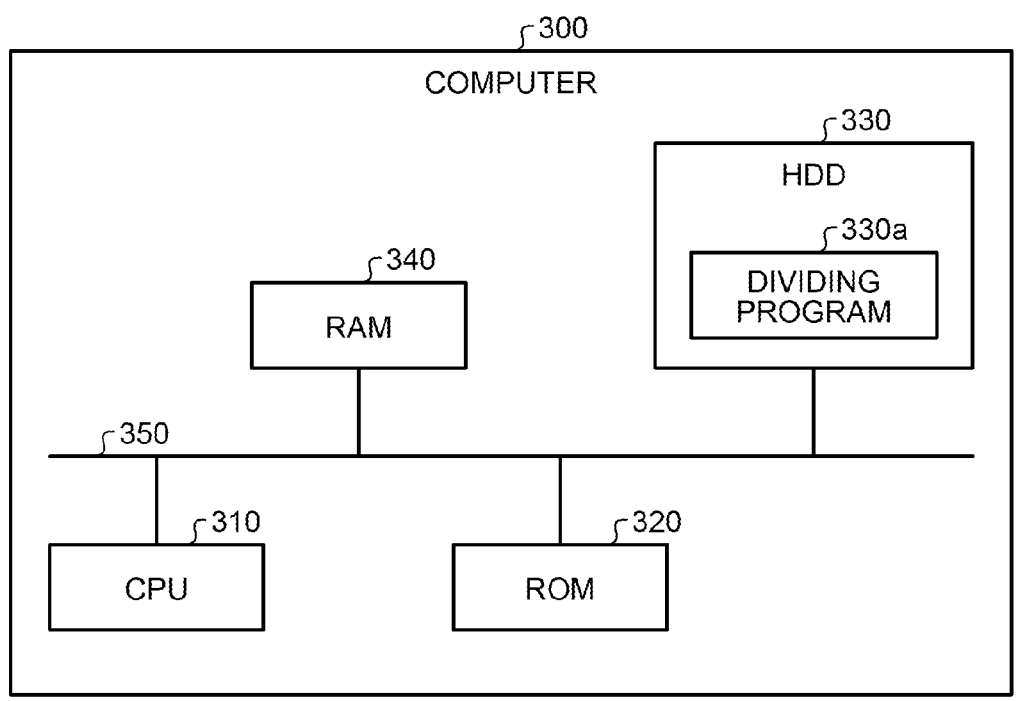
FIG. 26 is a block diagram illustrating the hardware configuration of a computer operating as the behavioral synthesis device according to the first embodiment.

FIG. 26 is a block diagram illustrating the hardware configuration of a computer operating as the behavioral synthesis device according to the first embodiment. As illustrated in FIG. 26, a computer 300 includes a central processing unit (CPU) 310 that executes various kinds of computation processes, a read only memory (ROM) 320, a hard disk drive (HDD) 330, and a random access memory (RAM) 340. Each of the devices 310 to 340 are connected by a bus 350.

The HDD 330 stores therein a dividing program 330a that causes the computer 300 to execute the same processes as those performed by the determining units 22 to 22c and the dividing units 23 to 23c. The CPU 310 reads the dividing program 330a stored in the HDD 330, loads the dividing program 330a in the RAM 340, and executes the program, thereby performing various kinds of processed.

The dividing program 330a described above is not always stored in the HDD 330. For example, the computer 300 may also read and execute programs stored in a storage medium that can be read by the computer 300. Examples of the storage medium that can be read by the computer 300 include a portable recording medium, such as a CD-ROM, a DVD disk, a universal serial bus (USB) memory, or the like; a semiconductor memory, such as a flash memory, or the like; and a hard disk drive. Furthermore, the program may also be stored in a device connected to, for example, a public circuit, the Internet, a local area network (LAN), or the like and the computer 300 may also read and execute the program from the recording medium described above.

According to an aspect of an embodiment, an advantage is provided in that the time taken to design a circuit can be reduced.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a state machine dividing program that causes a computer to execute a process comprising:
   determining whether a design value is greater than a predetermined reference value, the design value being based on circuit information that includes various kinds of information indicating the performance or the attribute of a circuit that controls a computation process included in a state machine; and
   dividing, when the design value is greater than the reference value, the state machine into a plurality of state machines by distributing each of states held in the state machine into the plurality of state machines.

2. The non-transitory computer-readable recording medium according to claim 1, wherein the dividing includes dividing, when the design value is greater than the reference value, the state machine into a sub state machine that has the same number of states as the reference value and a main state machine that has states, the number of which is associated with a value obtained by dividing the design value by the reference value.

3. The non-transitory computer-readable recording medium according to claim 1, wherein the dividing includes not dividing the state machine when a value obtained by dividing the number of states held in the state machine by the value obtained by dividing the design value by the reference value is smaller than a predetermined threshold and includes dividing, when the value obtained by dividing the number of states held in the state machine by the value obtained by dividing the design value by the reference value is equal to or greater than the predetermined threshold, the state machine into a main state machine that has the same number of states as a value associated with the value obtained by dividing the design value by the reference value and a sub state machine that has the same number of states as a value associated with a value obtained by dividing the number of states held in the state machine by the number of states held in the main state machine.

4. The non-transitory computer-readable recording medium according to claim 1, wherein the dividing includes sequentially dividing the state machine until the design value is equal to or less than the reference value.

5. The non-transitory computer-readable recording medium according to claim 1, wherein the determining includes determining whether a design value that indicates the number of states held in the state machine is greater than a specified reference value that indicates the number of states.

6. The non-transitory computer-readable recording medium according to claim 1, wherein the determining includes determining whether a design value that indicates a period during which the circuit completes a predetermined process is greater than a specified reference value that indicates a period.

7. The non-transitory computer-readable recording medium according to claim 1, wherein the determining includes determining whether a design value that indicates the number of computations executed until the circuit completes the process is greater than a specified reference value that indicates the number of computations.

8. The non-transitory computer-readable recording medium according to claim 1, wherein the determining includes determining whether a design value that indicates a reference count corresponding to the number of times the states held in the state machine are referred to is greater than a specified reference value that indicates the reference count.

9. A non-transitory computer-readable recording medium storing a state machine dividing program that causes a computer to execute a process comprising:
    determining whether a design value is greater than a predetermined reference value, the design value being based on circuit information that includes various kinds of information indicating the performance or the attribute of a circuit that controls a computation process included in a state machine; and
    outputting, when the design value is greater than the reference value, circuit information in which information about a flip-flop that becomes a reference target of a state in the state machine is added.

10. The non-transitory computer-readable recording medium according to claim 9, wherein the outputting includes outputting circuit information in which a flip-flop, the number of which is associated with a value obtained by dividing the design value by the reference value, is added.

11. An information processing apparatus comprising:
    a processor configured to execute a process including:
    determining whether a design value is greater than a predetermined reference value, the design value being based on circuit information that includes various kinds of information indicating the performance or the attribute of a circuit that controls a computation process included in a state machine; and
    dividing, when the design value is greater than the reference value, the state machine into a plurality of state machines by distributing each of states held in the state machine into the plurality of state machines.

12. An information processing apparatus comprising:
    a processor configured to execute a process including:
    determining whether a design value is greater than a predetermined reference value, the design value being based on circuit information that includes various kinds of information indicating the performance or the attribute of a circuit that controls a computation process included in a state machine; and
    outputting, when the design value exceeds the reference value, circuit information in which information about a flip-flop that becomes a reference target of a state in the state machine is added.

13. A state machine dividing method comprising:
    determining whether a design value is greater than a predetermined reference value, by a processor, the design value being based on circuit information that includes various kinds of information indicating the performance or the attribute of a circuit that controls a computation process included in a state machine; and
    dividing, when the design value is greater than the reference value, the state machine into a plurality of state machines by distributing each of states held in the state machine into the plurality of state machines, by the processor.

14. A state machine dividing method comprising:
    determining whether a design value is greater than a predetermined reference value, by a processor, the design value being based on circuit information that includes various kinds of information indicating the performance or the attribute of a circuit that controls a computation process included in a state machine; and
    outputting, when the design value is greater than the reference value, circuit information in which information about a flip-flop that becomes a reference target of a state in the state machine is added, by the processor.

* * * * *